US009961251B2

United States Patent
Kievsky et al.

(10) Patent No.: US 9,961,251 B2
(45) Date of Patent: May 1, 2018

(54) METHODS FOR ADJUSTING CONTROL PARAMETERS ON AN IMAGE CAPTURE DEVICE

(71) Applicant: CANON KABUSHIKI KAISHA, Tokyo (JP)

(72) Inventors: Andres Nicolas Kievsky, South Penrith (AU); Ij Eric Wang, Denistone (AU)

(73) Assignee: Canon Kabushiki Kaisha, Tokyo (JP)

(*) Notice: Subject to any disclaimer, the term of this patent is extended or adjusted under 35 U.S.C. 154(b) by 79 days.

(21) Appl. No.: 15/254,783

(22) Filed: Sep. 1, 2016

(65) Prior Publication Data

US 2017/0070659 A1 Mar. 9, 2017

(30) Foreign Application Priority Data

Sep. 8, 2015 (AU) ................................ 2015224397

(51) Int. Cl.
*H04N 5/232* (2006.01)

(52) U.S. Cl.
CPC ..... *H04N 5/23206* (2013.01); *H04N 5/23216* (2013.01); *H04N 5/23293* (2013.01)

(58) Field of Classification Search
None
See application file for complete search history.

(56) References Cited

U.S. PATENT DOCUMENTS

| 8,984,431 | B2 | 3/2015 | Chaudhri et al. | |
|---|---|---|---|---|
| 2004/0189802 | A1* | 9/2004 | Flannery | H04N 5/23203 348/143 |
| 2006/0114341 | A1* | 6/2006 | Morinaga | H04N 5/232 348/240.1 |
| 2007/0064104 | A1* | 3/2007 | Ikeda | G08B 13/19689 348/143 |
| 2012/0014684 | A1 | 1/2012 | D'Souza | |

(Continued)

OTHER PUBLICATIONS

Justin Matejka, et al. Reducing the Effects of Latency in Online Video Scrubbing. In Proceedings of the SIGCHI Conference on Human Factors in Computing Systems. May 2012. p. 637-646. Proceedings from CHI '12, Austin, Texas, USA.

*Primary Examiner* — W B Perkey
(74) *Attorney, Agent, or Firm* — Canon U.S.A., Inc. IP Division

(57) ABSTRACT

A computer-implementable method of adjusting a control parameter of an image capture device includes detecting, determining, and transmitting. At an interactive display device, a substantially continuous user selection of values of a control parameter of the image capture device is detected from user manipulation of a continuously-variable input control of the interactive display device. A rate of change is determined of the user selected values of the control parameter during user manipulation of the continuously-variable input control. Based upon at least the determined rate of change, it is determined whether to transmit each of the selected values. The selected values are sequentially transmitted to the image capture device, via a communications network, where the selected values are determined to be transmitted. Each of the transmitted values is transmitted as an interim control parameter value, and the transmitted values are adapted to adjust the control parameter of the image capture device.

17 Claims, 18 Drawing Sheets

(56) References Cited

U.S. PATENT DOCUMENTS

| | | |
|---|---|---|
| 2012/0095619 A1 | 4/2012 | Pack |
| 2013/0128074 A1* | 5/2013 | Mitsugi .................. H04N 5/232 |
| | | 348/223.1 |
| 2013/0163947 A1* | 6/2013 | O'Neill .................. H04N 5/772 |
| | | 386/227 |
| 2017/0070659 A1* | 3/2017 | Kievsky ............. H04N 5/23206 |
| 2017/0180650 A1* | 6/2017 | Hayashi ............. H04N 5/23293 |
| 2017/0262708 A1* | 9/2017 | Wang .................. G06F 3/0488 |

* cited by examiner

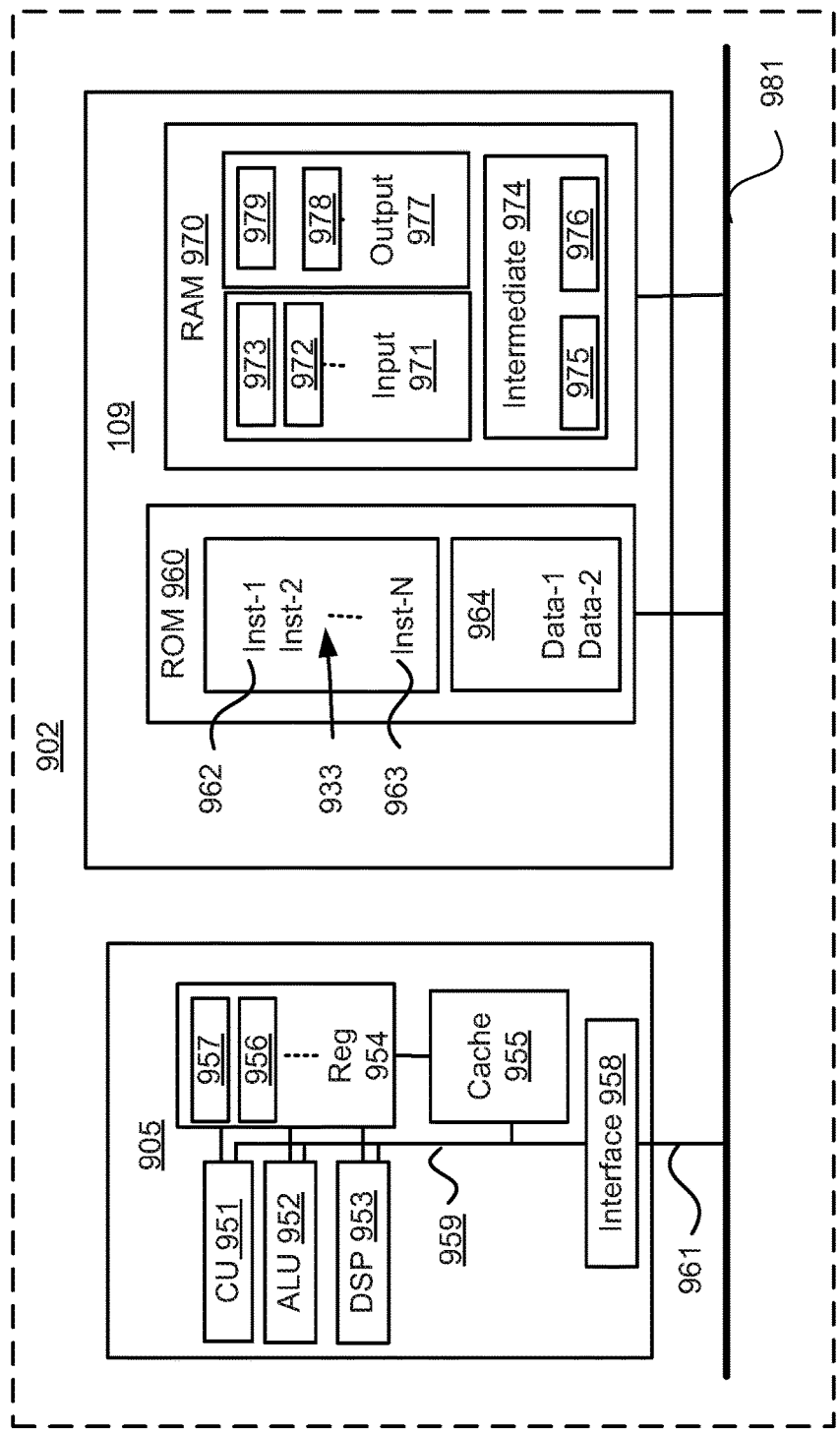

METHODS FOR ADJUSTING CONTROL PARAMETERS ON AN IMAGE CAPTURE DEVICE

REFERENCE TO RELATED PATENT APPLICATION(S)

This application claims the benefit under 35 U.S.C. § 119 of the filing date of Australian Patent Application No. 2015224397, filed 8 Sep. 2015, hereby incorporated by reference in its entirety as if fully set forth herein.

TECHNICAL FIELD

The present invention relates to user interfaces for remotely controlling an image capture device. In particular, the present invention relates to a method, system and computer-readable medium for adjusting a control parameter of a remote image capture device.

BACKGROUND

As technology advances, image capture devices become more capable. The continuous development of image capture devices is accompanied by the introduction of new features and workflows. Image capture devices can now be remotely controlled. Other display devices can present a user of an image capture device with output by displaying the captured image. Further, the other display devices can allow for monitoring and control of an image capture device.

Display devices (such as mobile devices, smartphones, tablets, laptop computers, and the like) are being used to operate remote image capture devices (such as film, video, surveillance, photographic, still cameras and generally any device that can generate content in image form or whose output can be converted to image form). Remote operation of image capture devices is usually performed across communications networks. Examples of such communications networks include but are not limited to (i) wired networks such as Ethernet, DSL/ADSL, cable, dial-up, power-line communication (PLC), (ii) wireless networks such as Bluetooth, satellite, Wi-Fi, mobile telephony; and (iii) hybrid (wired and wireless) networks.

Typically, a user inputs a selection to change an image capture device parameter using a user interface of a remote display device, for example using radio buttons, drop down lists, sliders, scrollbars, spinners, scrubbing bars or dials. The selected image parameter is then transmitted to the image capture device via the communication network.

However, such communications networks are characterised by the introduction of delay. Such delay may be caused by protocol overhead, bandwidth limits, latency, availability and other issues. Image capture devices often contain mechanical components, bound to mechanical processes which further increase delay when a remote operation is requested.

Due to widespread familiarity with mobile devices, users expect immediate feedback after each selection of a parameter using a remote display device. The speed of mobile device processing is usually capable of providing immediate feedback. However, communications delays coupled with the image capture device's intrinsic mechanical delays often prevent the immediate provision of feedback. Such delay can cause the user to be confused about whether the selected parameter has been applied to the image they are viewing or whether further parameter adjustments are required.

A need exists to address problems in remotely adjusting a control parameter of an image capture device.

SUMMARY

It is an object of the present disclosure to substantially overcome, or at least ameliorate, at least one disadvantage of present arrangements.

A first aspect of the present disclosure provides a computer-implementable method of adjusting a control parameter of an image capture device, comprising: detecting, at an interactive display device, a substantially continuous user selection of values of a control parameter of the image capture device, said user selection being detected from user manipulation of a continuously-variable input control of the interactive display device; determining a rate of change of the user selected values of the control parameter during user manipulation of the input control; determining based upon at least the determined rate of change, whether to transmit each of the selected values; and sequentially transmitting, the selected values to the image capture device, via a communications network, where the selected values are determined to be transmitted, wherein each of the transmitted values is transmitted as an interim control parameter value, and the transmitted values are adapted to adjust the control parameter of the image capture device.

In further aspects, the rate of change is speed and the determined rate of change is non-zero.

In further aspects the transmission is triggered according to the determined rate of change and a delay associated with adjustment of the control parameter by the image capture device.

In further aspects the delay is determined based upon at least one of delay associated with the communications network and delay associated with operation of the image capture device.

In some aspects, the method further comprises detecting in real-time, by the interactive display device via the communications network, a status of the image capture device in relation to the control parameter, and displaying in real-time, by the interactive display device, a comparison of the detected status and the user selection of values.

In further aspects, presentation of the comparison displayed by the interactive display device is dependent upon a difference between the status of the image capture device and the user selection of values.

In further aspects, at least one of determining the rate of change of the user selected values, the determining whether to transmit each of the selected values, and the sequentially transmitting the selected values, is implemented by the interactive display device.

In further aspects, at least one of determining the rate of change of the user selected values, the determining whether to transmit each of the selected values, and the sequentially transmitting the selected values, is implemented by a server computer in communication with the interactive display device via the communications network.

In further aspects, the determined rate of change comprises determining at least one of speed and acceleration.

In further aspects, the method further comprises determining both speed and acceleration, and predicting a final user selection from the determined speed and acceleration In further aspects, the step of determining whether to transmit each of the selected values and sequentially transmitting the selected values are executed during user manipulation of the input control.

In further aspects, the method further comprises: detecting that the user manipulation of the continuously-variable input control has reached a stopping point; and determining, based upon the stopping point, whether to transmit a final control parameter value to the image capture device, the final control parameter value being adapted to adjust the control parameter of the image capture device.

In further aspects, determining whether to transmit a final control parameter value to the image capture device is based upon a predicted final value of the control parameter value.

In further aspects, the method further comprises receiving, by the interactive display device via the communications network, output of the image capture device, the output being generated according to one of the interim control parameter values and received during the user manipulation of the input control; and displaying, by the interactive display device, the output to the user.

A further aspect of the present disclosure provides an interactive display device for adjusting a control parameter of an image capture device, comprising: a memory; a processor coupled to the memory for executing a computer program, said computer program comprising instructions for: detecting a substantially continuous user selection of values of a control parameter of the image capture device, said user selection being detected from user manipulation of a continuously-variable input control of the interactive display device; and determining a rate of change of the user selected values of the control parameter during user manipulation of the input control; determining based upon at least the determined rate of change, whether to transmit each of the selected values; and sequentially transmitting, the selected values to the image capture device, via a communications network, where the selected values are determined to be transmitted, wherein each of the transmitted values is transmitted as an interim control parameter value, and the transmitted values are adapted to adjust the control parameter of the image capture device.

A further aspect of the present disclosure provides a non-transitory computer readable storage medium having a computer program stored thereon for adjusting a control parameter of an image capture device, comprising: code for detecting a substantially continuous user selection of values of a control parameter of the image capture device, said user selection being detected from user manipulation of a continuously-variable input control of the interactive display device; code for determining a rate of change of the user selected values of the control parameter during user manipulation of the input control; code for determining, based upon at least the determined rate of change, whether to transmit each of the selected values; and code for sequentially transmitting, the selected values to the image capture device, via a communications network, where the selected values are determined to be transmitted, wherein each of the transmitted values is transmitted as an interim control parameter value, and the transmitted values are adapted to adjust the control parameter of the image capture device.

A further aspect of the present disclosure provides a system, comprising: an image capture device; an interactive display device; and a communications network coupling the image capture device to the interactive display device; wherein the system is adapted to adjust a control parameter of the image capture device by: detecting, at the interactive display device, a substantially continuous user selection of values of a control parameter of the image capture device, said user selection being detected from user manipulation of a continuously-variable input control of the interactive display device; determining a rate of change of the user selected values of the control parameter during user manipulation of the input control; determining, based upon at least the determined rate of change, whether to transmit each of the selected values; and sequentially transmitting, the selected values to the image capture device, via a communications network, where the selected values are determined to be transmitted, wherein each of the transmitted values is transmitted as an interim control parameter value, and the transmitted values are adapted to adjust the control parameter of the image capture device.

Other aspects are also disclosed

BRIEF DESCRIPTION OF THE DRAWINGS

One or more embodiments of the invention will now be described with reference to the following drawings, in which:

FIGS. 9A and 9B collectively form a schematic block diagram representation of an electronic device upon which described arrangements can be practised;

DETAILED DESCRIPTION INCLUDING BEST MODE

Figure 1:
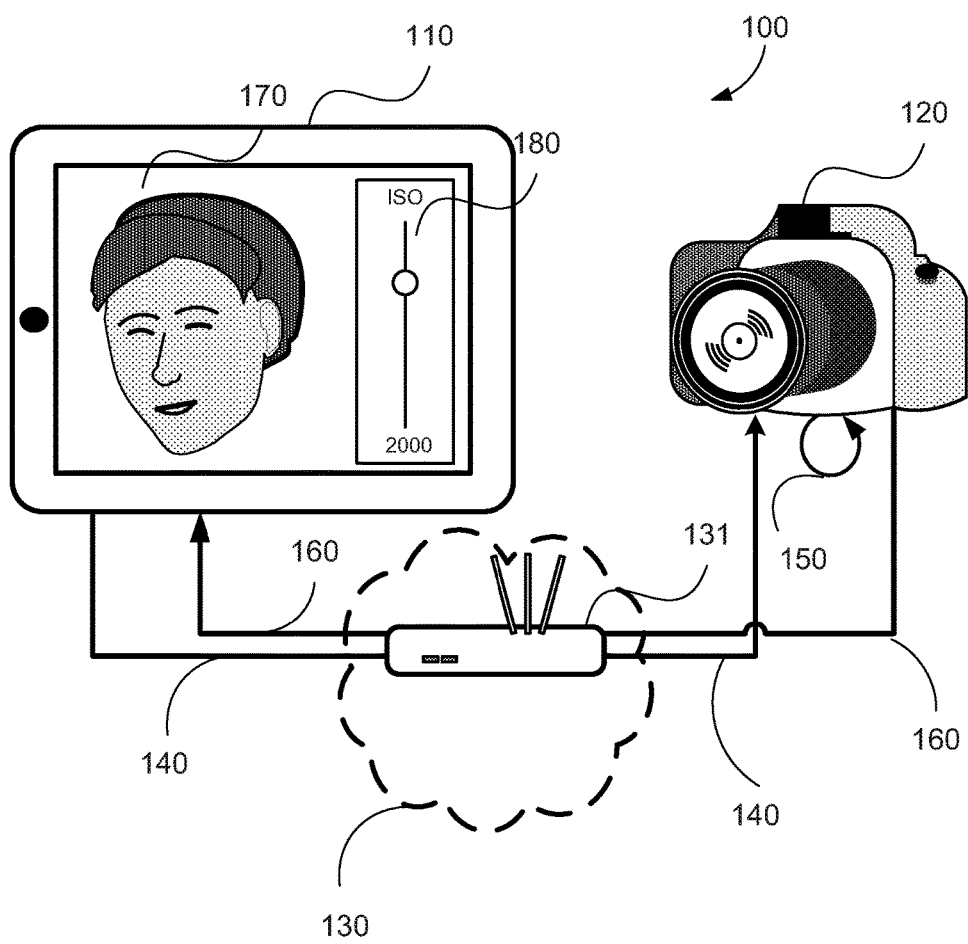
FIG. 1 is a schematic architecture within which methods of adjusting a control parameter of an image capture device can be practised.

FIG. 1 shows an example system 100 where the arrangements described can be practised.

In the system 100, an interactive display device 110 (also referred to as a display device) can communicate with an image capture device 120 via a communications network 130. Examples of the communications network include, but are not limited, to (i) wired networks such as Ethernet, DSL/ADSL, cable, dial-up, power-line communication (PLC), (ii) wireless networks such as Bluetooth™, satellite, Wi-Fi (including protocols based on the standards of the IEEE 802.11 family), mobile telephony; and (iii) hybrid networks. In a preferred arrangement the interactive display device 110 is a tablet device. However, the interactive display device 110 may be any electronic device capable of displaying images or video, executing a graphical user interface, and communicating over the communications network 130. Examples of interactive display devices include mobile devices, smartphones, laptop computers and the like. The image capture device 120 may be any electronic device that can generate content in image form or whose output can be converted to image form for example a still camera, a digital camera, a video camera and the like.

In the example arrangement of FIG. 1, the communications network 130 includes a router 131. The network 130 enables the display device 110 to transmit control parameter value changes, as illustrated by connection 140. The image capture device 120 accordingly adjusts a value of the control parameter, as illustrated by an arrow 150. The image capture device 120 transmits a notification back to the display device 110, as illustrated by connection 160. The notification informs the display device that the image capture device 120 has finished operation of adjusting the control parameter.

The system 100 provides a means by which the display device 110 can monitor the image capture device 120 in near real-time, and present the user with a status of the image capture device in near real-time. The status of the image capture device 120 includes, but is not limited to, all control parameter values in use by the image capture device 120, a video sequence generated by the image capture device 120 and any other software or hardware parameters present in the image capture device 120.

A video sequence transmitted from the image capture device 120 via the connection 160 is displayed to the user as a presentation 170 via a display of the interactive display device 110. In an alternative arrangement, the system 100 may use a separate device such as a Teradek Cube™ to transmit video from the image capture device 120 to the display device 110.

The system 100 further allows the display device 110 to trigger adjustments of control parameters of the image capture device 120. Examples of control parameters of the image capture device 120 include exposure/gain, shutter speed, white balance, focus, aperture, ND Value, AE Shift, autofocus mode, menu system control and selected autofocus position, as well as any other parameter that can be adjusted in an image capture device. In some arrangements, certain parameters may not be present or may include other types of parameters, depending on the image capture device being used. The control parameters can conveniently be adjusted using a continuously-variable input control. The user can check whether they have reached the desired level of the parameter by viewing the video presentation 170 on the display device 110. The continuously-variable input control is typically a single selection input control in which variation of a selected control parameter value appears (to the user) to proceed in a temporally uninterrupted fashion, such as near real-time, even when the set of control parameters values to choose from is not continuous, and typically requiring high-frequency events.

A graphical user interface (GUI) operable one the interactive display device 110 provides a means for the user to interact with the presentation 170 and adjust control settings. Such a GUI may include a selection user interface (UI) widget. Selection UI widgets which permit continuously-variable operation (such as sliders, scrollbars, scrubbing bars, dials, etc.) necessarily generate more UI events than UI widgets that do not permit continuously-variable operation in response to user manipulation. Continuously variable UI provides a graded, typically linear, scale between maximum and minimum values. A user can generate a large number of events through normal interaction with input controls such as UI widget with continuously-variable operation. As an example, in touch-sensitive devices such as a tablet, high-frequency events can result from shifting the contact position of a finger as the finger slides across a touch-sensitive device to manipulate the input control and vary the selection. In other UI paradigms the same events may be generated using a mouse, a stylus, etc.

The user's selection using such UI widgets is limited by the fact that the currently selected control parameter value is unique—selections cannot be made in parallel and are necessarily serial. Every event triggers an adjustment operation based on the selected control parameter value. Some examples of control parameter adjustment operations include updating a memory location to the selected value, saving the selected value to disc, updating a search area, displaying a selected frame, or communicating with a remote device (such as the device 120) and adjusting one of the parameters of the remote device to the selected value.

A slider system 180 (also referred to as a slider), as shown in FIG. 1, is an example of a continuously-variable selection UI. Sliders may be particularly useful for control parameters which have a range across a large number of values. Use of the slider 180 removes a necessity to label each individual value of the control parameter to be adjusted. Rather, a slider assigns a position to each value of the control parameter within the slider's minimum and maximum. Selections can then be performed by the user manipulation of the slider according to positional reference, whilst ongoing feedback is provided. As more values of the control parameter are present, the user is able to perform a more substantially continuous selection, where more intermediate values are present during the manipulation. A substantially continuous selection relates to a selection in which the user selects between a range of values using a manipulation or gesture greater than a predetermined period of time. Such may also relate to a user selection over range of changing values. Examples of a substantially continuous selection include a gesture such as a swipe on a touch screen, an application of pressure (e.g., to a pressure pad or a mouse), rolling of a roller-ball, depression of arrow keys on a keyboard, each being for more than the predetermined period of time. A selection such as a tap selecting a single item, e.g., a check-box from a list of check-boxes, would not normally be considered a substantially continuous selection.

The time required for the image capture device 120 to adjust a control parameter value is often bound by intrinsic mechanical processes as well as any queued up pending adjustments. Hence the resultant effect of adjusting the control parameter value at the image capture device 120 is relatively delayed.

One problem experienced with such an arrangement in the past is that, as substantially continuous user selection occurs, either of the devices 110 and 120 may build a queue of pending adjustments, widening a drift between control parameter settings recorded at the local and remote devices (110 and 120, respectively). As a result of the drift, any remote video presentation 170 transmitted from the image capture device 120 and shown by the display device 110 may reflect the result of adjustments requested further in the past than expected by the user. The user may resultantly mistakenly believe that an ongoing, visible adjustment was triggered by a recent change, when in fact the visible adjustment is the result of a former adjustment to the slider 180. The delay means that the user is likely to overshoot the desired image capture parameter, because the video presentation 170 that the user is viewing does not reflect the settings displayed on the slider 180, causing the user to believe that further adjustment is necessary.

Such issues have limited the usefulness of GUI widgets such as sliders to control remote image capture devices when feedback with minimal delay is desired. The arrangements described herein seek to reduce the user's confusion about the application of the image capture device parameters.

Figure 9A:
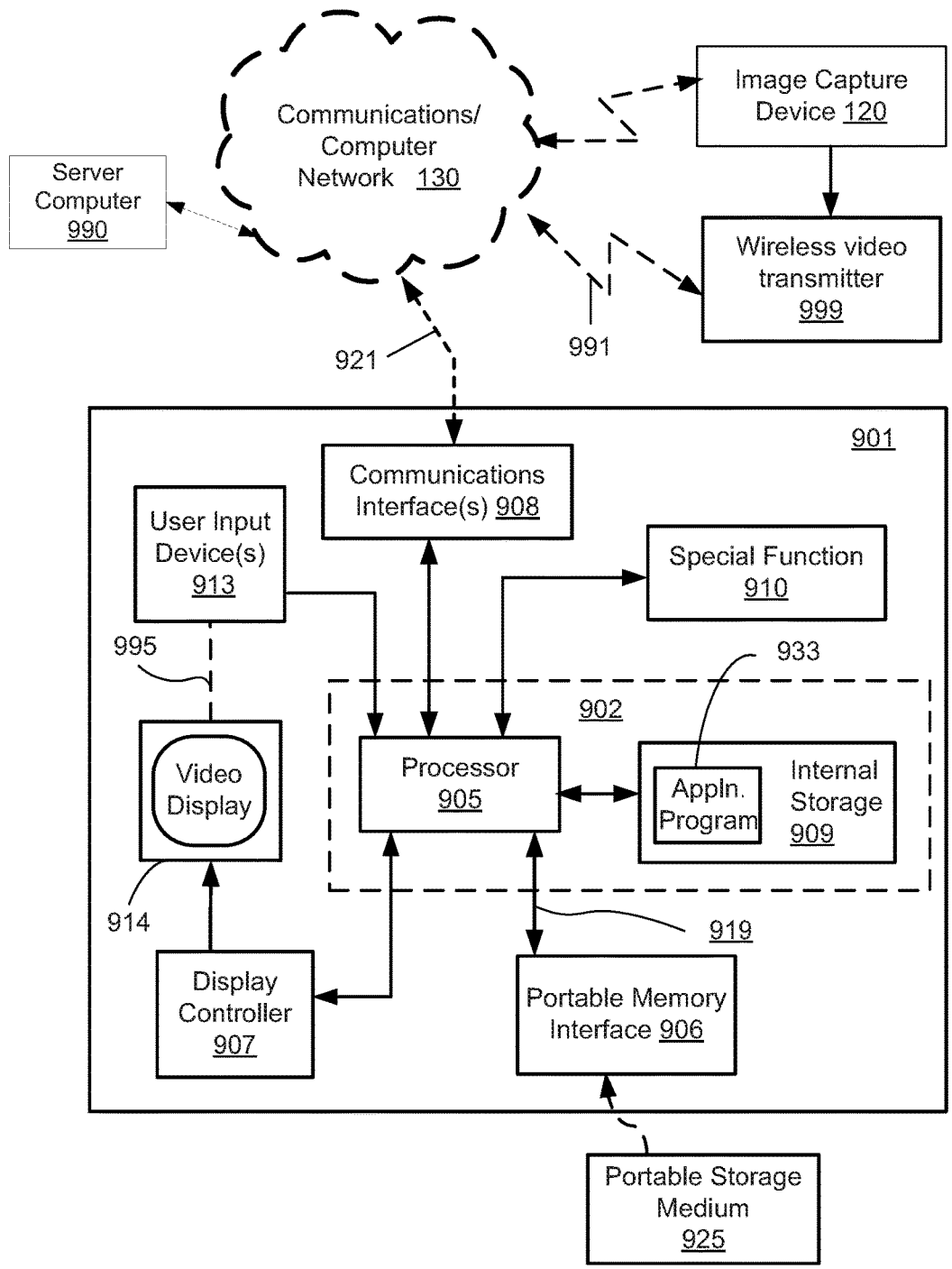

The methods described are typically implemented using at least one interactive portable electronic device, such as a tablet device, a smartphone, or the like, having a display suited to real-time video reproduction. FIGS. 9A and 9B collectively form a schematic block diagram of a general purpose electronic device 901 including embedded components, upon which the methods for adjusting a control parameter of an image capture device, to be described, are desirably practiced. In a preferred implementation the electronic device 901 is a portable tablet device having a touch-screen display akin to the tablet device 110 of FIG. 1. However, in other implementations the electronic device 901 may be another type of electronic device in which processing resources are generally limited, for example a mobile phone, a portable media player, or a smartphone, or an electronic image capture device such as a camera or video camera. Nevertheless, the methods to be described may also be performed on higher-level devices such as desktop computers, server computers, and other such devices with significantly larger processing resources.

As seen in FIG. 9A, the device 901 comprises an embedded controller 902. Accordingly, the device 901 may be referred to as an "embedded device." In the present example, the controller 902 has a processing unit (or processor) 905 which is bi-directionally coupled to an internal storage module 909. The storage module 909 may be formed from non-volatile semiconductor read only memory (ROM) 960 and semiconductor random access memory (RAM) 970, as seen in FIG. 9B. The RAM 970 may be volatile, non-volatile or a combination of volatile and non-volatile memory.

The device 901 includes a display controller 907, which is connected to a video display 914, such as a liquid crystal display (LCD) panel or the like. The display controller 907 is configured for displaying bitmap and graphical images on the video display 914 in accordance with instructions received from the embedded controller 902, to which the display controller 907 is connected.

The device 901 also includes user input devices 913 which are typically formed by keys, a keypad or like controls. In the example described herein, the user input devices 913 includes a touch sensitive panel physically associated with the display 914, as depicted by the dashed line 995, to collectively form a touch screen. For ease of reference, the combination of the display 914 and the user input devices 913 are referred to as a touch screen 914 in the arrangements described, consistent with that type of structure as found in traditional tablet devices, such as the Apple iPad™. The touch screen 914 may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 9A, the device 901 also comprises a portable memory interface 906, which is coupled to the processor 905 via a connection 919. The portable memory interface 906 allows a complementary portable memory device 925 to be coupled to the tablet device 901 to act as a source or destination of data or to supplement the internal storage module 909. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The device 901 also has a communications interface 908 to permit coupling of the device 901 to a computer or the communications network 130 via a connection 921. The communications network 130 couples the device 901 to the image capture device 120. The connection 921 may be wired or wireless. For example, the connection 921 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like. In the preferred implementations, the communications interface operates according to Wi-Fi standards.

In some instances, the device 901 is configured to perform some special function. The embedded controller 902, possibly in conjunction with further special function components 910, is provided to perform that special function. For example, where the device 901 is a digital camera, the components 910 may represent a lens, focus control and image sensor of the camera. The special function components 910 is connected to the embedded controller 902. As another example, the device 901 may be a mobile telephone handset. In this instance, the components 910 may represent those components required for communications in a cellular telephone environment. Where the device 901 is a portable device, the special function components 910 may represent a number of encoders and decoders of a type including Joint Photographic Experts Group (JPEG), (Moving Picture Experts Group) MPEG, MPEG-1 Audio Layer 3 (MP3), and the like. The special function components 910 may also relate to operation of the touch screen 914.

The system 900 may also include a server computer 990 with which the electronic device 901 may communicate via the network 130. Some aspect of the arrangements described may be executed on the server computer 990, as described hereafter.

The methods described hereinafter may be implemented using the embedded controller 902, where the processes of FIGS. 2, 6, 7 and 11 may be implemented as one or more software application programs 933 executable within the embedded controller 902. The device 901 of FIG. 9A implements the described methods. In particular, with reference to FIG. 9B, the steps of the described methods are effected by instructions in the software 933 that are carried out within the controller 902. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 933 of the embedded controller 902 is typically stored in the non-volatile ROM 960 of the internal storage module 909. The software 933 stored in the ROM 960 can be updated when required from a computer readable medium or via communication with a server computer such as a cloud computer. The software 933 can be loaded into and executed by the processor 905. In some instances, the processor 905 may execute software instructions that are located in RAM 970. Software instructions may be loaded into the RAM 970 by the processor 905 initiating a copy of one or more code modules from ROM 960 into RAM 970. Alternatively, the software instructions of one or more code modules may be pre-installed in a non-volatile region of RAM 970 by a manufacturer. After one or more code modules have been located in RAM 970, the processor 905 may execute software instructions of the one or more code modules.

The application program 933 is typically pre-installed and stored in the ROM 960 by a manufacturer, prior to distribution of the tablet device 901. However, in some instances, the application programs 933 may be supplied to the user encoded on one or more CD-ROM (not shown) and read via the portable memory interface 906 of FIG. 9A prior to storage in the internal storage module 909 or in the portable memory 925. In another alternative, the software application program 933 may be read by the processor 905 from the network 130, or loaded into the controller 902 or the portable storage medium 925 from other computer readable media. Computer readable storage media refers to any non-transitory tangible storage medium that participates in providing instructions and/or data to the controller 902 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 901. Examples of transitory or non-tangible computer readable transmission media that may also participate in the provision of software, application programs, instructions and/or data to the device 901 include radio or infra-red transmission channels as well as a network connection to another computer or networked device, and the Internet or Intranets including e-mail transmissions and information recorded on Websites and the like. A computer readable storage medium having such software or computer program recorded on it is a computer program product.

The second part of the application programs 933 and the corresponding code modules mentioned above may be executed to implement one or more graphical user interfaces (GUIs) to be rendered or otherwise represented upon the display 914 of FIG. 9A. Through manipulation of the user input device 913 (e.g., the keypad or touch screen), a user of the device 901 and the application programs 933 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 9B illustrates in detail the embedded controller 902 having the processor 905 for executing the application programs 933 and the internal storage 909. The internal storage 909 comprises read only memory (ROM) 960 and random access memory (RAM) 970. The processor 905 is able to execute the application programs 933 stored in one or both of the connected memories 960 and 970. When the tablet device 901 is initially powered up, a system program resident in the ROM 960 is executed. The application program 933 permanently stored in the ROM 960 is sometimes referred to as "firmware". Execution of the firmware by the processor 905 may fulfil various functions, including processor management, memory management, device management, storage management and user interface.

The processor 905 typically includes a number of functional modules including a control unit (CU) 951, an arithmetic logic unit (ALU) 952, a digital signal processor (DSP) 953 and a local or internal memory comprising a set of registers 954 which typically contain atomic data elements 956, 957, along with internal buffer or cache memory 955. One or more internal buses 959 interconnect these functional modules. The processor 905 typically also has one or more interfaces 958 for communicating with external devices via system bus 981, using a connection 961.

The application program 933 includes a sequence of instructions 962 through 963 that may include conditional branch and loop instructions. The program 933 may also include data, which is used in execution of the program 933. This data may be stored as part of the instruction or in a separate location 964 within the ROM 960 or RAM 970.

In general, the processor 905 is given a set of instructions, which are executed therein. This set of instructions may be organised into blocks, which perform specific tasks or handle specific events that occur in the tablet device 901. Typically, the application program 933 waits for events and subsequently executes the block of code associated with that event. Events may be triggered in response to input from a user, via the user input devices 913 of FIG. 9A, as detected by the processor 905. Events may also be triggered in response to other sensors and interfaces in the tablet device 901.

The execution of a set of the instructions may require numeric variables to be read and modified. Such numeric variables are stored in the RAM 970. The methods described use input variables 971 that are stored in known locations 972, 973 in the memory 970. The input variables 971 are processed to produce output variables 977 that are stored in known locations 978, 979 in the memory 970. Intermediate variables 974 may be stored in additional memory locations in locations 975, 976 of the memory 970. Alternatively, some intermediate variables may only exist in the registers 954 of the processor 905.

The execution of a sequence of instructions is achieved in the processor 905 by repeated application of a fetch-execute cycle. The control unit 951 of the processor 905 maintains a register called the program counter, which contains the address in ROM 960 or RAM 970 of the next instruction to be executed. At the start of the fetch execute cycle, the contents of the memory address indexed by the program counter is loaded into the control unit 951. The instruction thus loaded controls the subsequent operation of the processor 905, causing for example, data to be loaded from ROM memory 960 into processor registers 954, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 933, and is performed by repeated execution of a fetch-execute cycle in the processor 905 or similar programmatic operation of other independent processor blocks in the tablet device 901.

As seen in FIG. 9A, the (tablet) device 901 is configured for communication with the image capture device 120 via a connection 921 to the network 130. In this specific example, the image capture device 120 is shown interfaced to the network 130 via a wireless video transmitter 999, such as the Teradek Cube™ device mentioned above, which forms an interconnection 991.

Methods of adjusting a control parameter of the image capture device 120 are now described.

Figure 2:
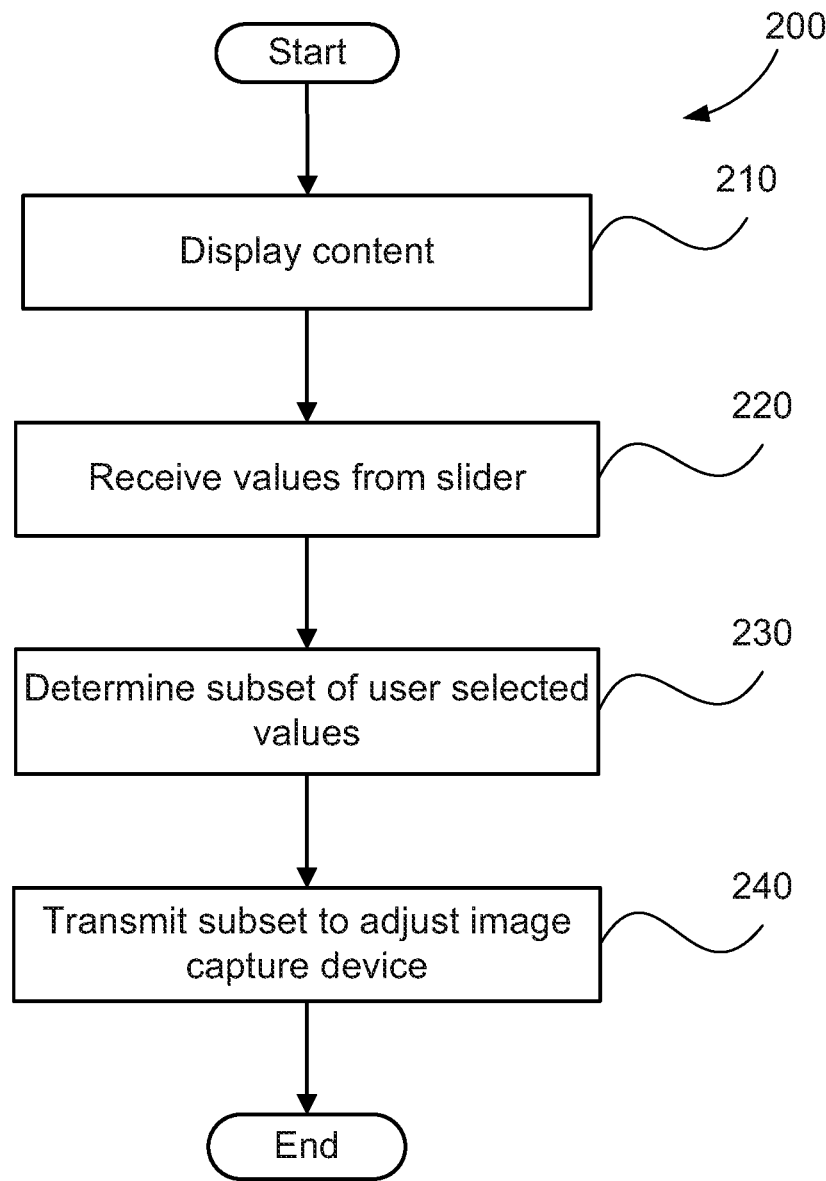
FIG. 2 is a schematic flow diagram of a method of adjusting a control parameter of an image capture device.

FIG. 2 shows a high-level method 200 of remotely adjusting a control parameter of the image capture device 120. The method 200 may be implemented as one or more submodules of the application 933, stored in a memory such as the memory 906 and controlled by execution of the processor 905.

The method 200 starts at step 210. On execution of the step 210, content (such as image capture device 120 status) is displayed by display device 110, for example via presentation on the touch screen 914.

The method 200 executes to progress from step 210 to step 220. At step 220, the user manipulates a continuously-variable input control provided by the display device 110, such as the slider 180. The continuously-variable input control is typically provided via a GUI application executing on the interactive display device 110 controlling presentation by the touch screen 914. The GUI application executes to detect the user manipulation. The user manipulation represents a substantially continuous user selection of control parameter values. The user manipulation of the continuously-variable input control causes the processor 905 to execute to generate events to be generated and received for processing. Each event indicates a user manipulation to select a value of a control parameter at a moment in time.

This continuously-variable input control may be a UI slider, scrollbar, scrubbing bar, dial, pressure-based input control on pressure sensitive hardware, or input control based on events generated by pressure sensitive hardware, 3D tracking, trackpad manipulation, automated interpretation of the user's body movement based on cameras or other sensors, or any other interactive device that allows substantially continuous user selection of values.

The control parameter values selected may be calculated from multi-dimensional information generated from the user manipulation itself, including output from hardware sensors measuring force of touch, position in three dimensions, detection accuracy, and the like.

The method 200 executes to progress from step 220 to step 230. A subset of the user-selected values is determined in execution of step 230. The subset of selected values may be determined based on the rate of change of user selected values. The rate of change is not restricted to speed (first order derivative) and acceleration (second order derivative) and includes higher order derivatives. For example, a jerk or jolt (third order derivative) may be numerically approximated and used as a rate of change.

In the arrangements described, the subset of selected values is calculated by determining active intervals (groups of events that are determined to be of interest to the user and may be used to generate values suitable for transmission to the image capture device 120). Active intervals may be determined based on the events relating to user manipulation received by the display device 110 so far (including positional and temporal information of each event). The determined active intervals may, for example, exclude events that correspond to periods having a rate of change (as calculated from such events) higher than a given threshold.

Events that are not part of an active interval are discarded at execution of step 230 so that such events will not be considered as part of a subset in step 240. Examples of how events can be discarded include marking the events as discarded, deleting the events from memory of the display device 110, or otherwise ensuring the events do not contribute to further processing.

Examples of events include those generated by a user manipulating the GUI application, for example by touching the touch screen 914 of the display device 110, clicking, dragging or moving a mouse attached to the display device 110, manipulating a trackpad, using a stylus, and the like. An event may include one or more of (i) a high-resolution timestamp indicating when the event was generated or received; (ii) a tuple of one or more coordinates specifying a contact position within an area (in one or more dimensions) where the event was detected on the screen 914 or within the presentation 170; (iii) a tuple of one or more components determining other detected or calculated input information such as pressure level, hand being used, mouse, accelerometer, etc.; and (iv) an optional plurality of associated data containing other events that may be part of the same gesture or interaction. Values can be generated from this information as is described in more detail in FIG. 5.

Other relevant information may be encoded within each event. The dimensions of the contact position need not be limited to two components, and can be extended to three or more components (for example, when encoding points in space, directional components, etc.).

In other arrangements, events can be included in the active interval when those events correspond to periods where the speed (as determined from these events) is higher than a given threshold but a de-acceleration has been detected. The combination of speed and de-acceleration is used to predict the intended user selection. In further arrangements, the predicted selection is used to transmit control parameter values that will efficiently adjust the image capture device 120 to match the predicted user selection.

Events that would not result in an adjustment of the control parameter value of image capture device 120 may also be discarded in step 230. Subsets of events may be further refined by discarding events based on rate limiting.

Once the subset has been determined, the method 200 executes to progress from step 230 to step 240. The step 240 executes to transmit the determined subset of values in order to adjust control parameters of the image capture device 120.

Some of the steps of the method 200 are typically performed asynchronously and may not always happen in the same order or sequentially. At any point during the steps of the method 200, feedback may be provided to the user by presentation by the display device 110.

Providing feedback may be done by displaying information on the touch screen 914. Such information may include, but not be limited to, control parameter name, image capture device control parameter value, slider control parameter value, image capture device status, adjustment status, reception of user selection of values and events, determination of subsets as in step 230, video received at the device 110, and network connection status.

Feedback may also be provided by changing the style of the graphical elements presented by the display device to correspond with events such as changes in the drift between local and remote control parameter values, network delay changes or disconnections, and the like.

Feedback may include displaying simulated or processed media to more closely resemble the slider's manipulated value and image capture device status.

Figure 3:
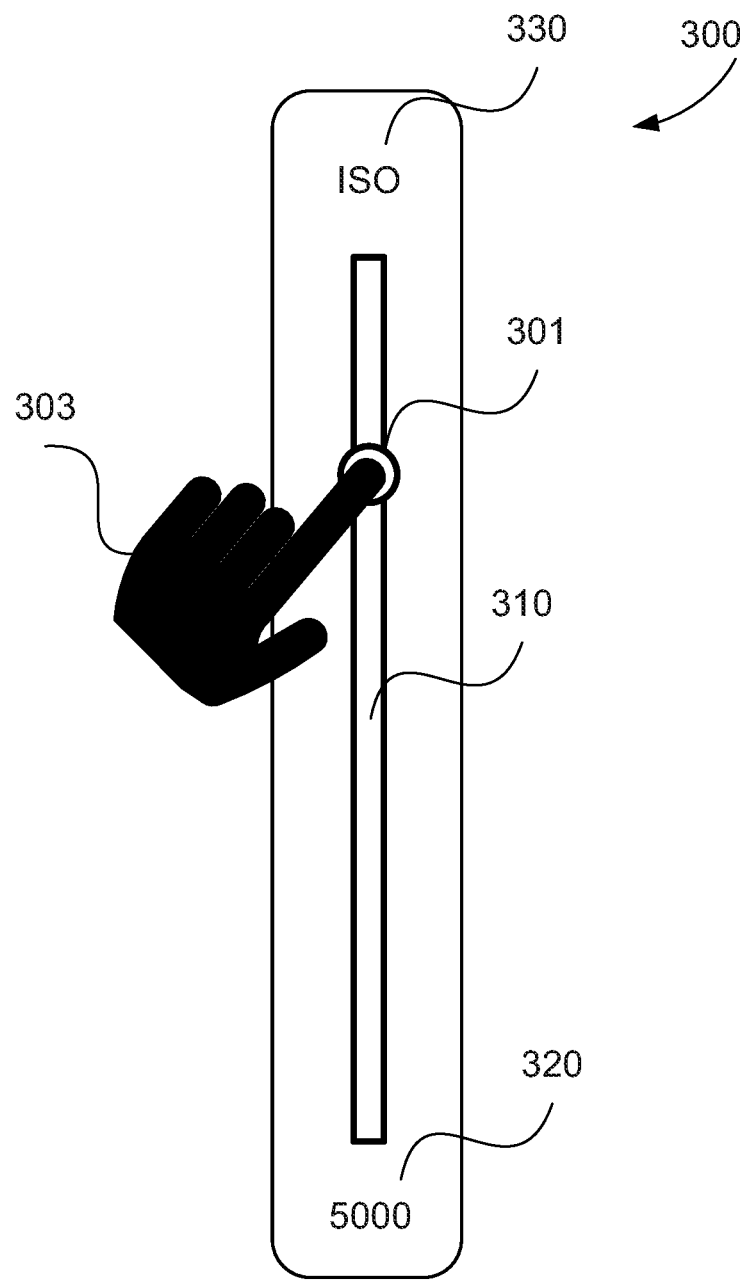
FIGS. 3, 4 and 5 are schematic representations of a slider system.
Figure 4:
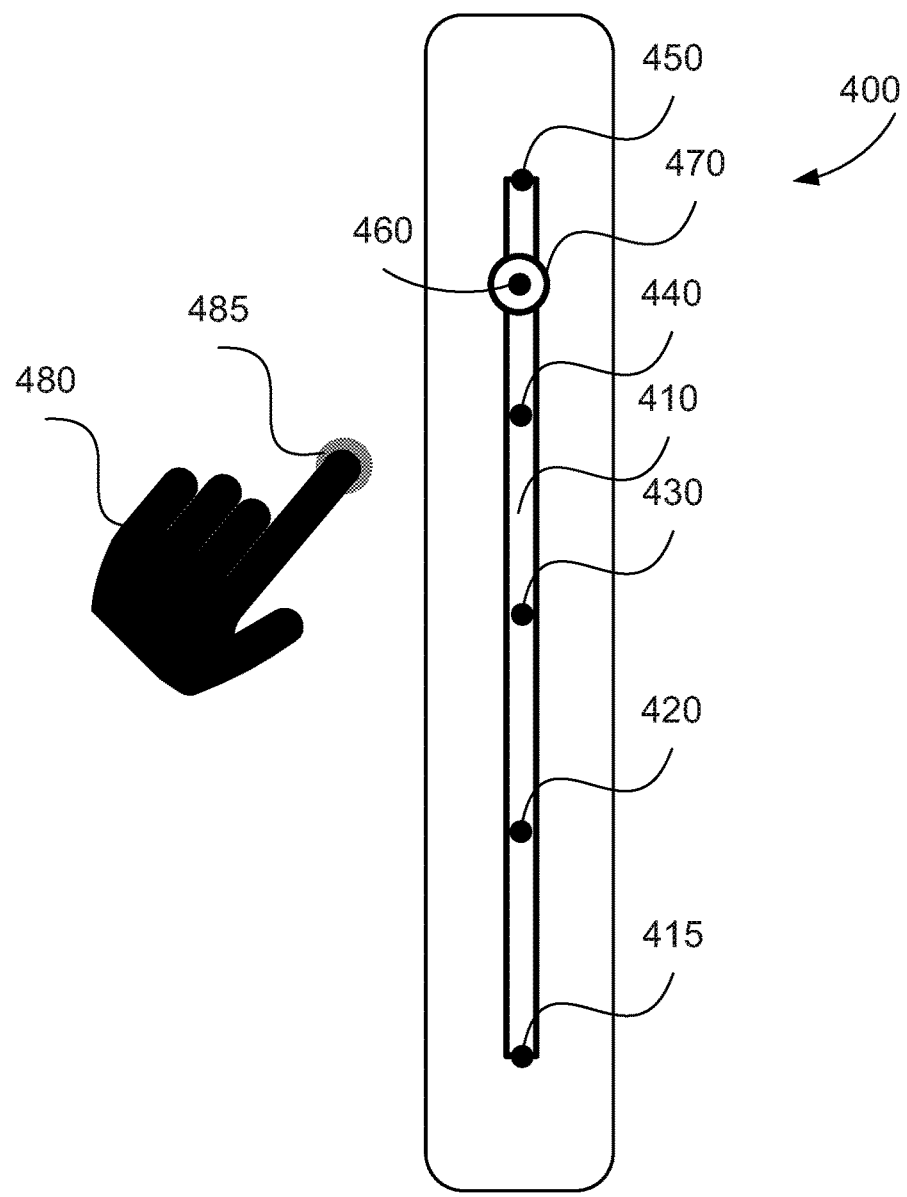

FIGS. 3 and 4 illustrate parts of an exemplary UI slider system that may be implemented by execution of the application 933 on display device 110. A slider system 300, shown in FIG. 3 may be assigned to a control parameter of the image capture device 120. The slider 300 forms part of a GUI presentation displayed on the touch screen 914. A description of elements and basic behaviour of the slider system 300 is now described. Such behaviour is hereafter used as a base to describe other operational aspects and variations of the slider system 300. While a slider is used in the arrangements described herein, the arrangements described can equally apply to other input controls including multi-dimensional continuously-variable input controls (for example a 2 dimensional slider, a trackpad, and 3 dimensional slider or a pressure sensitive track pad).

In the arrangements described, the slider system 300 is presented to the user via the touch screen 914 under execution of the processor 905. A user manipulation or touch of the touch screen 914 is indicated by an icon 303 representing a hand of the user. With reference to FIG. 3, the slider system parts include (i) an indicator 301 manipulated by the user hand 303 to interact with the slider and mark a selected position on the slider, (ii) a track 310 along which the indicator 301 can slide (that is, be repositioned), (iii) a value label 320 specifying the currently selected value of the relevant control parameter, and (iv) a control parameter label 330 indicating the control parameter to which the slider 300 relates. Alternative arrangements may exclude some parts of the system 300.

FIG. 4 shows a slider system 400 similar to the system 300. In the slider system 400, a set of distinct positions within the track 410 are associated with the slider state: a minimum position 415, maximum position 450 and current slider position 460 corresponding to indicator 470.

The track 410 also includes value positions, in this example positions 415, 420, 430, 440 and 450 (within track 410) each corresponding to a distinct slider value associated with the control parameter being modified. For example in the case of control parameter ISO, which adjusts the sensor sensitivity of the image capture device 120, the positions within the track 410 can be associated with the following values: 400 for 415, 800 for 420, 1000 for 430, 2000 for 440 and 5000 for 450. The number of distinct slider values is typically higher but has been reduced for illustration purposes.

The control parameter value corresponding to a track position may be determined by using the underlying operating system facilities—typically setting a minimum and maximum value pair and receiving a corresponding slider value during an event. In other arrangements, the control parameter value may be determined by calculating an intermediate value with minimum 0 and maximum 1 from the position within the track 410 and mapping a set of allowed values to distinct intervals within 0-1.

In other arrangements, the display device 110 need not know the control parameter to transmit. In such arrangements, the display device 110 may calculate an intermediate value with minimum 0 and maximum 1 and use the intermediate value as the slider value in order to allow the image capture device determine the final control parameter value based on the intermediate value. In such arrangements the slider represents a scale between minimum and maximum values of the control parameter rather than a true value of the control parameter.

If a user's hand 480 forms a contact position 485 on indicator 470, a user manipulation of the slider starts and the current slider position 460 is set to a point within the track 410 closest to the contact position 485. The user can then vary the contact position 485 which causes current slider position 460 to move along with the indicator 470.

The current value of the slider may be determined by considering all value positions of the track 410 (in this example the positions 415, 420, 430, 440, 450); measuring the distance between each value position against the current slider position 460 and assigning the value associated to the closest value position (in this example the position 440). Thus, as the user varies the contact position 485, the current value of the slider is varied correspondingly.

Figure 5:
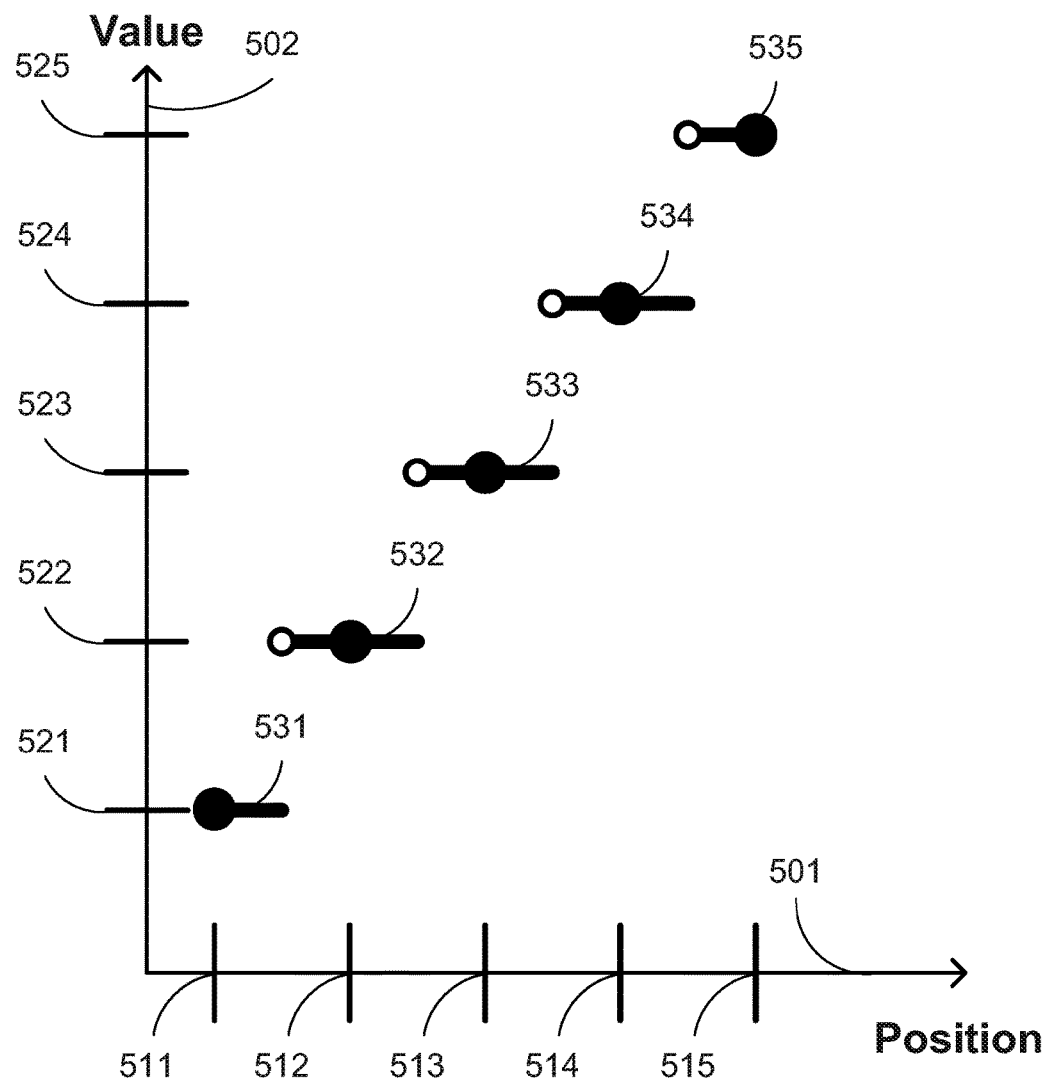

FIG. 5 shows a graph 500 exemplifying a relationship between positions of the slider 300, as shown on axis 501, and values of a control parameter, shown on axis 502, as part of system 300. In the example of FIG. 5, the position axis 501 consists of a one dimensional component of a given slider position, calculated by retaining only the component of the given slider position that is parallel to the slider's track. Hence, the slider position 511 corresponds the value 521 as indicated by point 531. Similarly, the position 512 corresponds to value 522 (see 532), 513 corresponds to value 523 (see 533), 514 corresponds to value 524 (see 534) and to 515 corresponds value 525 (see 535). Other methods of calculating a value 502 using positional, temporal or other event information are possible.

Figure 6:
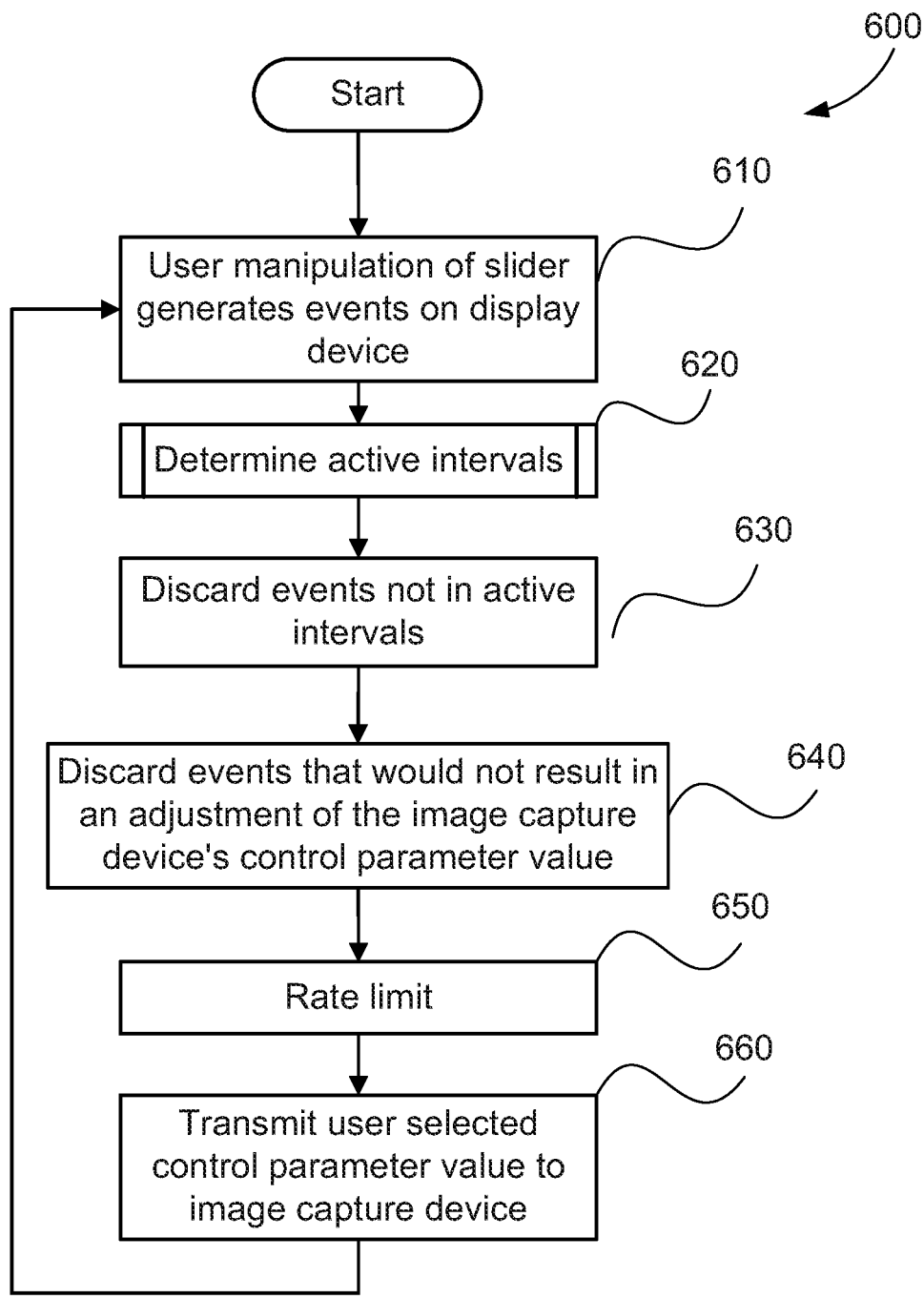
FIG. 6 is a schematic flow diagram of a method of using a slider system to generate adjustments of a control parameter value of an image capture device.

With reference to FIG. 6, a method 600 of remotely adjusting a control parameter of the image capture device 120 is now described. The method 600 represents a preferred arrangement of using a UI slider to generate adjustments of the control parameter value of the image capture device 120. The method 600 may be implemented as one or more submodules of the application 933, stored in a memory such as the memory 906 and controlled by execution of the processor 905.

The method 600 starts at step 610. The step 610 executes upon generation of events on the interactive display device 110 generated upon detection of user manipulation of the slider. Typically, the underlying operating system and GUI application of the interactive display device 110 execute to provide the events as the user interacts with the interactive display device 110. The operating system of the interactive display device 110 usually provides events by execution of event-based APIs (Application Programming Interfaces) provided by the operating system that allow reception and detection of events of interest, for example by user manipulation of the touch screen 914.

The method 600 executes to progress from step 610 to step 620. Using the events generated in step 610, active intervals are then determined in execution of step 620. The active intervals are determined in order to find potentially meaningful groups of events. An exemplary method 700 of determining active intervals, as executed at step 620, is described hereafter in relation to FIG. 7. In the arrangements described, each event includes a flag which encodes whether the event is part of an active interval or not. Each flag is set in execution of step 620 and passed on with the detailed events to step 630. Determination of active intervals at step 620 effectively operates to determine a rate of change for user selected values during user manipulation of the slider, and determining, based upon the rate of change, whether each of the selected values is to be transmitted to the image capture device 120. In some arrangements, determination of active intervals may also depend on a direction of the user selection of values. For example, user manipulation of the slider in a certain direction may relate to the image capture device 120 entering an extended mode in which an increased range of control parameter values is available. Such an arrangement allows the time taken for the image capture device 120 to change between modes to be taken into account.

In the arrangements described, each event additionally includes a flag which marks whether the event has been discarded. After execution of step 620, the method 600 proceeds to step 630. Step 630 executes to mark any event as discarded when the event has been marked by step 620 as not being part of an active interval.

The method 600 executes to progress from step 630 to step 640. The events corresponding to active intervals are passed on to from step 630 to step 640. Execution of step 640 discards any events that would not result in an adjustment of the control parameter value of image capture device 120. Such may be done by, for example, comparing a corresponding selected value of each event to the value of the control parameter of the remote image capture device 120 and discarding events where the two values match.

The method 600 executes to progress from step 640 to step 650. Step 640 outputs events which have not been discarded to step 650. Step 650 executes to perform a rate limit process that further filters the events. Rate limiting effectively filters events based upon a delay associated with adjustment of the control parameter by the image capture device 120.

Rate limiting may be implemented statically by discarding any events that are within a pre-defined time delta to any preceding events. The time delta can be set to an estimated expected delay for the current control parameter. The estimated expected delay may be determined from specifics of the image capture device 120, for example relating to mechanical or operating constraints of the image capture device 120.

Rate limiting may also be performed dynamically by discarding events received while image capture device 120 is not ready to start a new adjustment operation. Readiness of the image capture device 120 may be determined by the image capture device status, real-time network monitoring, and the like.

Rate limiting accordingly relates to a delay associated with operation of the image capture device 120. In other arrangements, rate limiting may depend upon delay associated with the communications network 130 instead of or in addition to delay associated with operation of the image capture device 120.

The method 600 continues to execute by passing the events produced by rate limiting step 650 to step 660. In the arrangements described, the slider values determined from events that reach step 660 without being discarded become part of a subset of user selected values. Discarded values are excluded from the subset.

However, feedback on events discarded in execution of steps 630, 640 or 650 may still be provided to the user, even though such events are not transmitted to the image capture device 120.

Step 660 executes to sequentially transmit control parameter values to the image capture device 120. The transmission is only triggered by control parameter values which are part of the subset of user selected values. Operation of step 660 may be implemented asynchronously to keep the interface (GUI) of the display device 110 responsive and allow processing events in a timely fashion. Ongoing monitoring of the image capture device 120 allows the display device 110 to react to changes in the control parameter. Transmission triggers an adjustment of the control parameter value at the image capture device 120.

The sequential transmission of values at step 660 is effectively triggered by the rate of change of the user selected values (by determination of active intervals at step 620) and a delay associated with adjustment of the image capture device (at step 650). In other arrangements, the step 650 may be excluded. In such arrangements, the sequential transmission of values at step 660 is effectively triggered by the rate of change of the user selected values only.

Steps 620 to 640 of the method 600 execute during user manipulation of the slider. Accordingly, the control parameter of the image capture device may be adjusted a number of times before the user manipulation has ended (for example by the user lifting their finger form the touch screen 914). The selected values transmitted to the image capture device at step 660 may be considered interim control parameter values adapted to adjust the control parameter of the image capture device 120. The selected values may be considered 'interim control parameter values' because they are transmitted while the user is still manipulating the control. The transmitted values may be adapted to adjust the control parameter of the image capture device 120 by including information in the transmission to cause the control parameter value to change on the image capture device, for example information about the control parameter to adjust the control parameter value.

The method 600 executes to return to step 610 when a new substantially continuous user selection of values is received.

The steps 620 to 660 of the method 600 are typically executed on the interactive display device 110. In some arrangements, the steps 620 to 660 may be executed on another device, such as the server computer 990.

Figure 8:
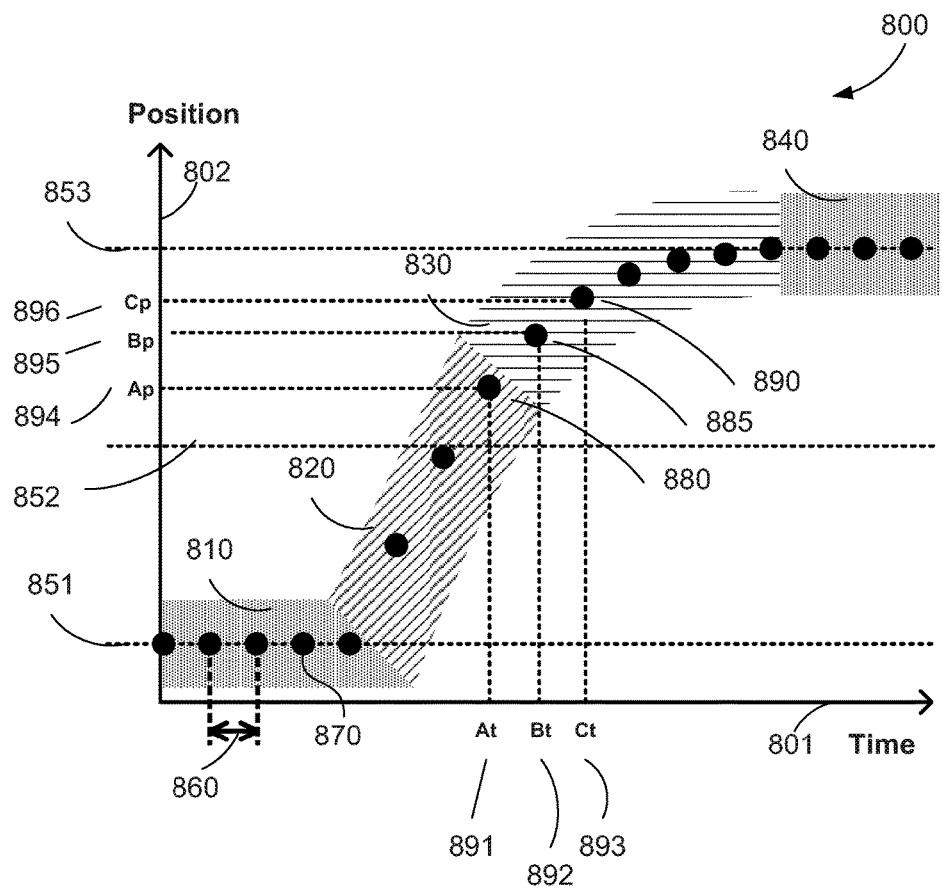
FIG. 8 is a graph showing an example for determination of active intervals using the method of FIG. 7.

FIG. 8 shows a graph 800 illustrating the relationship between time, shown on an axis 801, and contact position on the touch screen 914, shown on an axis 802. The graph 800 includes a set of events received from the user's manipulation of the slider and which link both dimensions. For simplicity, each event (such as an event 870) is shown using a constant polling rate 860. Lines 851, 852 and 853 of the graph 800 correspond to distinct slider values. As the user manipulates the slider, events are received as at step 610. Such events are graphed as points similar to the event 870). In the graph 800, the events can be divided into four areas: (i) area 810; (ii) area 820; (iii) area 830; and (iv) area 840.

The events within the area 810 show little positional change and correspond very closely with horizontal line 851. It is useful to consider the events in the area 810 as an indication of the user's interest in the value associated with the line 851.

The area 820 includes rapidly changing events that approach and then extend beyond the line 852. Unlike the events in the area 810, the events of the area 820 show the user to be uninterested in the value corresponding to line 852. The inventors consider it advantageous to discard the events in the area 820, as an adjustment 150 of the image control device 120 may not be done in time before the user has moved away to select a different contact point, given the delays affecting these adjustments.

Events in the area 830 change less rapidly than those of the area 820. Analysis of the area 830 indicates that the user is slowing down their manipulation and getting ready to choose a value of the corresponding control parameter. Events in the area 830 accordingly should not be discarded as the area 830 includes valuable information that can be used to prepare for the possible selection of the value corresponding to the line 853. In some arrangements, the de-acceleration of user manipulation can be used to predict the intended user selection.

The events within the area 840 are distributed similarly to those in the area 810, showing little positional change, and corresponding very closely with the line 853. The events in the area 840 must not be discarded. However, events in the area 840 will not trigger any remote adjustments, since discarding the events in the area 820 maintains the image capture device ready to accept the adjustment once the events in the area 830 are processed.

The areas 840 may represent an end of user manipulation of the slider, for example the user lifting their finger from the touch screen 914. Such may result in transmission of a final control parameter to the image capture device, or transmission of a final control parameter value may not be required, as described in relation to FIG. 11.

The inventors therefore consider it advantageous to define active intervals to exclude events which show the user to be selecting values which, due to the rate of change or other characteristics, are unlikely to contain meaningful value selections, or are simply impossible for the image capture device 120 to reach before the user can select another event.

Advantages of using the slider control arrangements include a more responsive experience as a continuously-variable input control would not be usable otherwise, and a less responsive UI widget would have to be used. Continuously-variable input controls are easy to use and well-known by users, and minute, ongoing adjustments are enabled according to the arrangements described herein.

Active interval determination (as executed at step 620) allows execution of the application 933 to discern the user's intent in the received manipulation and respond accordingly. Active interval determination also restricts the adjustments to control parameter values of interest to the user. Such obtains a faster result than would otherwise be possible.

Events discarded in execution of steps 630, 640 and 650 conserve bandwidth and minimise delay as adjustment requests are only transmitted when needed and only at acceptable rates. Unnecessary transmissions are kept to a minimum and the user is not able to overwhelm the image capture device 120 with adjustment requests. Further, neither the display device 110 nor the image capture device 120 need to queue unfinished operations.

Figure 7:
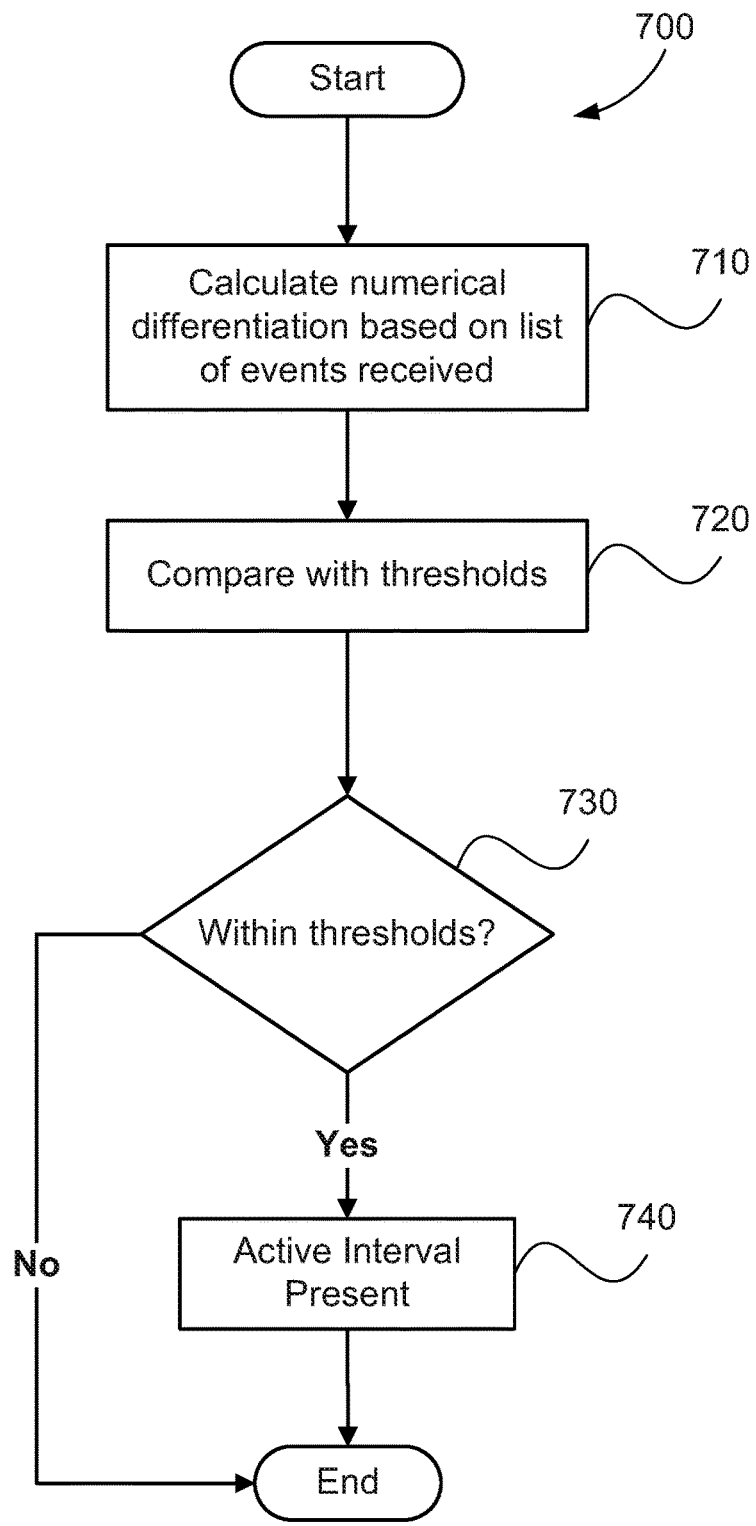
FIG. 7 is a schematic flow diagram of a method of determining active intervals, as used in the method of FIG. 6.

FIG. 7 shows the method 700 for determining active intervals, as may be executed at step 620 of FIG. 6. The method 700 may be implemented as one or more submodules of the application 933, stored in a memory such as the memory 906 and controlled by execution of the processor 905.

The method 700 starts when events are passed from the step 610 to the step 620. As the events are passed, the method 700 starts by executing step 710. In execution of step 710, the received events are added to a list of received values. Referring to FIG. 8, the graph 800 shows an example of three consecutive events 880, 885 and 890. The step 710 executes to determine numerical differentiation for the events 880, 885 and 890.

Each of the events 880, 885 and 890 is associated with a temporal component and positional component as shown in FIG. 8 and in Table 1:

TABLE 1

| Event | Temporal component | Positional component |
|---|---|---|
| A 880 | 891 | 894 |
| B 885 | 892 | 895 |
| C 890 | 893 | 896 |

Given a constant UI event polling rate (that is, the temporal distance between the components 891 and 892 is equal to the temporal distance between 892 and 893, and using this time difference as a unit) the positional change between events A and B per unit of time change may be determined using:

Speed 1=ABS(Position(*B*)−Position(*A*)) (Equation 1)

In Equation 1 above, the function Position(event) returns the positional component (contact position) of a given event and the function ABS(x) returns the absolute value of the argument. The ABS(x) function can be replaced with a distance function (such as the Euclidian distance between B and A) if the positional components are multi-dimensional. A rate of change is effectively calculated for each user selection of control parameter values.

Referring back to FIG. 7, after execution of step 710, the method 700 progresses to step 720. A thresholding process takes place in execution of step 720. The thresholding process also comprises comparing the determined Speed 1 (referred to as S1) against a predetermined threshold T1. The method 700 executes to progress from step 720 to step 730. Step 730 executes to determine if S1 is within the threshold T1. The following condition may be used at step 730 for the comparison as a Boolean test:

$S1 <= T1$ (Equation 2)

If equation 2 is satisfied, and if S1 is not 0, that is the speed S1 is non-zero and within the threshold T1, step 730 returns a "Yes" and the method 700 progresses to step 740. The received event is determined to be part of an active interval and marked accordingly in execution of step 740. Step 730 effectively operates to determine if user selected values are transmitted based upon a rate of change of the selected values.

Following execution of step 740, the method 700 ends.

If the speed S1 is 0 or determined not to be within the threshold T1 at step 730, the received event is not considered to be part of an active interval. The step 730 returns a "No" and the method 700 ends.

Using an example of a 100 ms sampling rate, a threshold T1 corresponding to 10 pixels per 100 ms can be used to exclude events where the speed is larger than 100 pixels per second.

In other arrangements, the rate of change of the user selected values is at least one of speed and acceleration. In alternative arrangements, both the speed and acceleration of the user manipulation are used to determine which events are part of active intervals. A positional change between events B and C per unit of time change may be determined using:

Speed 2=ABS(Position(*C*)−Position(*B*)) (Equation 3)

From the two speeds S1 and Speed 2, an estimate of the acceleration rate (that is, the approximate second order derivative) may be determined using:

Acceleration Rate 1=Speed 2−Speed 1 (Equation 4)

The Speed 2 is hereafter referred to as S2, and Acceleration Rate 1 referred to as AR1.

Referring back to FIG. 7, after step 710, a threshold comparison process is executed in step 720. In the arrangements described, a second threshold is introduced having T2>T1. Events having a speed between T1 and T2 are candidates for inclusion in the active interval if the acceleration relating to those events is less than a threshold T3, where T3<0. In other words, such events relate to de-acceleration of the user manipulation, as determined by using two rates of change (speed and acceleration).

In such arrangements, the following condition may be used as a Boolean test in execution of step 730:

$S2 <= T1 \text{ OR} (S2 <= T2 \text{ AND } AR1 <= T3)$ (Equation 5)

If Equation 5 is satisfied (step 730 returns a "Yes"), the newest received event is determined to be part of an active interval and marked as such in step 740. Otherwise, if Equation 5 is not satisfied, the newest received event is not determined to be part of an active interval.

Using an example, given a 100 ms sampling rate, a T1 corresponding to 10 pixels per 100 ms and a T2 of 20 pixels per 100 ms and T3 of −10 pixels per 100 ms² can be used to exclude events where the speed is larger than 100 pixels per second, or events where the speed is between 100 and 200 pixels per second and de-acceleration is greater than 10 pixels per 100 ms².

In a further arrangement the speed and de-acceleration of the user manipulation can be used to predict the intended user selection. For example, the speed and the deceleration may be used to predict selection of the value corresponding to line 853 of FIG. 8, where the speed is 0. To determine the predicted selection, known formulae $V=u+at$ and $s=ut+\frac{1}{2}at^2$ (where V is speed, s is displacement, u is initial position, a is acceleration and t is elapsed time) could be used to arrive at the value corresponding to the line 853. Other methods could also be used to predict the selection. With the predicted selection, the control parameter values that are sent to the image capture device 120 may be modified. For example, intermediate control parameter values may not be sent to the image capture device 120. Instead, the intermediate values would be replaced by only a single control parameter value matching the predicted selection.

Even though the three points 880, 885 and 890 are used to determine approximated speed and acceleration, other numerical methods including higher-order methods can be used to differentiate discontinuous multi-dimensional data and produce similar differentials. Further derivatives of the position, speed and the acceleration of the selected values may also be used to determine whether to transmit values.

It is important to provide feedback so that the user can tell what control parameter value is reflected in present video display by the device 110, and which value of the control parameter the user has selected. A number of examples of how such feedback can be displayed are now described.

Figure 10A:
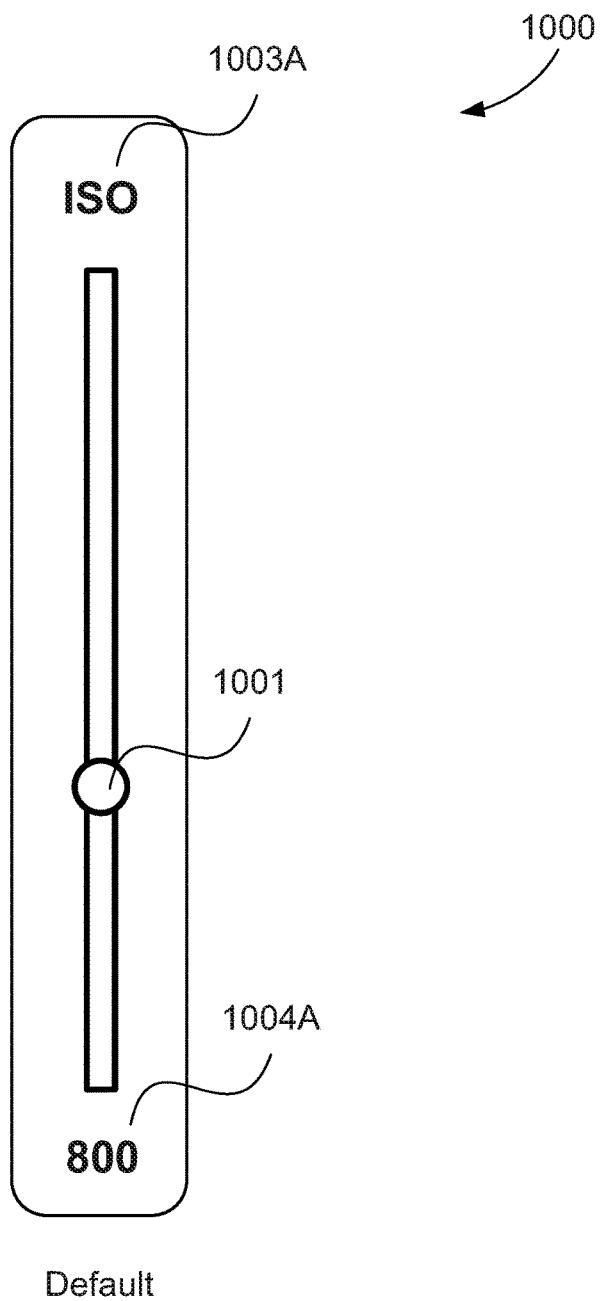
FIGS. 10A, 10B and 10C show operation of a method of providing feedback to a user.

FIG. 10A shows a default state for a slider 1000. In the default state, the control parameter value of the image capture device 120 correlates (is equal to) to a current value as determined from the position of an indicator 1001. The current value of the control parameter is displayed by a label 1004A, being a value 800 in the example of FIG. 10A. The name of the control parameter (in this example ISO) is displayed by a label 1003A.

To provide feedback of correlation between the value of the control parameter in video being presented and a setting selected by the user, the labels 1003A and 1004A may be rendered in a "default" style, for example in bold font. Other elements of the slider 1000 may also be rendered in a "default" style.

Styles relate to collections of graphic properties and may include but are not limited to (i) font properties such as family, colour, size, weight, kerning, variant; (ii) graphical element properties such as size, position, alpha component, foreground colour, background colour, border size and colour, etc.

Figure 10B:
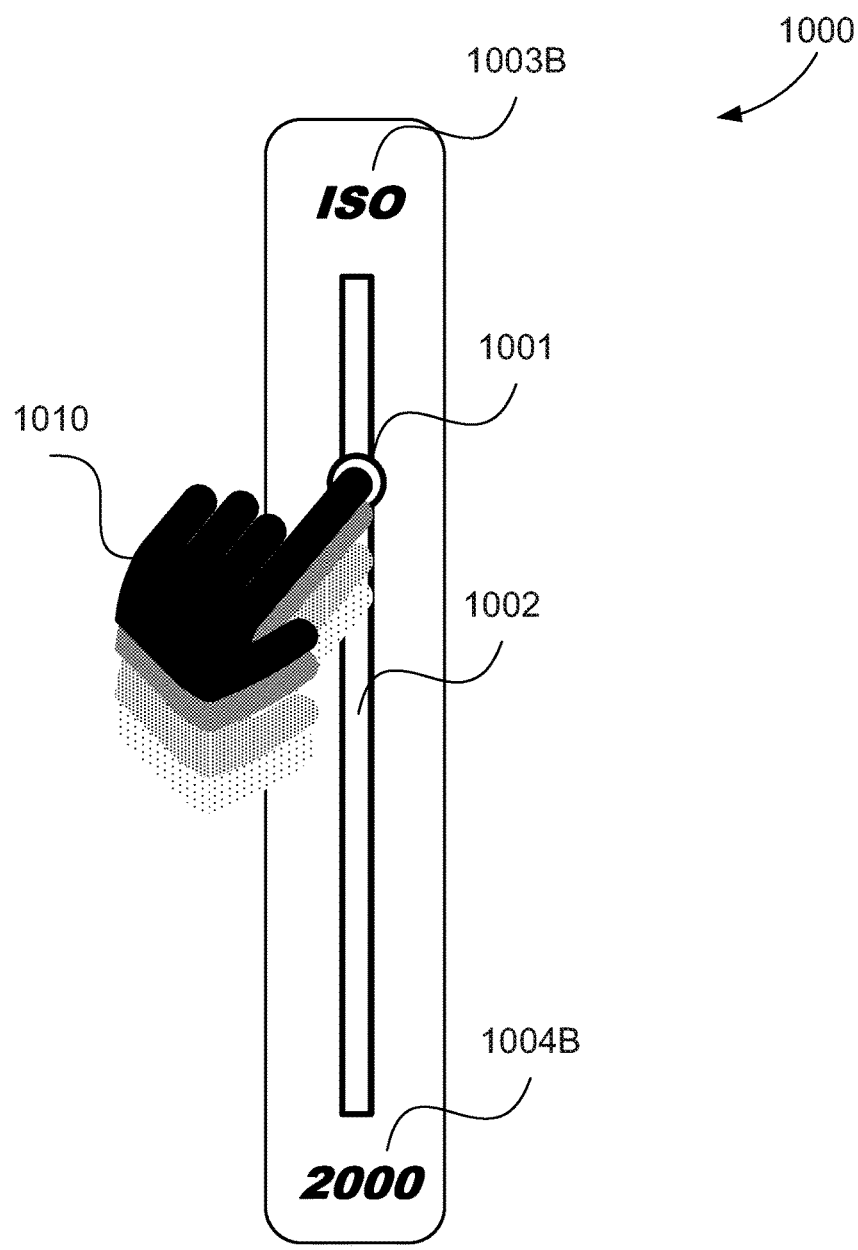

FIG. 10B shows a "pending" example. FIG. 10B relates to an instance where a user has instructed an adjustment of a control parameter, but such has not yet been adjusted at the image capture device 120. Once a user manipulation, indicated by an icon 1010, causes the current value of the control parameter as determined from the position of the indicator 1001 to move on a track 1002. The current value no longer correlates to the control parameter value being used in the image capture device 120. Accordingly, a "pending" style may be used to render the labels as illustrated in 1003B and 1004B, in this example in bold and italic font. Other elements of the slider 1000 may be rendered in a "default" style.

Figure 10C:
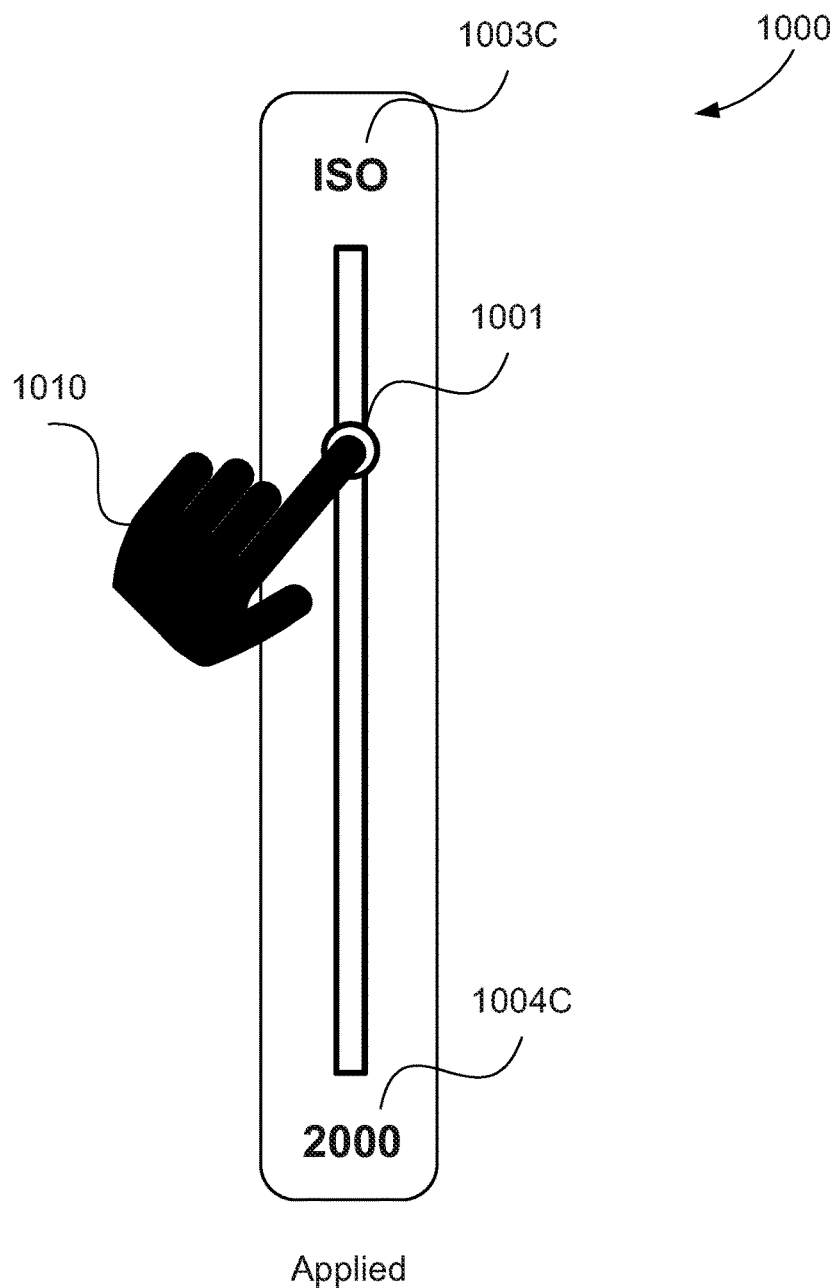

FIG. 10C shows an example of an "applied" situation—that is where the adjustment instructed by the user has been made at the image capture device 120. Once the correlation between the position of indicator 1001 and the control parameter value in image capture device 120 is restored (due to user action indicated by 1010 having triggered and finished a remote adjustment) an "applied" style may be used to render the labels shown by 1003C and 1004C.

The "applied" style need not be equal to the "default" style in order for the user to differentiate between the two states. Other parts of the slider 1000 may also be rendered in an "applied" style.

As an example, labels 1003A and 1004A may be rendered in an Arial font, bold variation for the "default" style. In the "pending" style, the font used may be Arial Black in bold italic variation as in 1003B and 1004B. In the "applied" style, the font may once again be Arial font, bold variation as in 1003C and 1004C.

Changing from one style to another accordingly may be indicated visually. In some arrangements, visual indication of a change in style may be accompanied by sound. In some arrangements, sound may also be used to announce any changes in the correlation between indicator position 1001 and the corresponding control parameter value used in the image capture device 120.

Figure 10D:
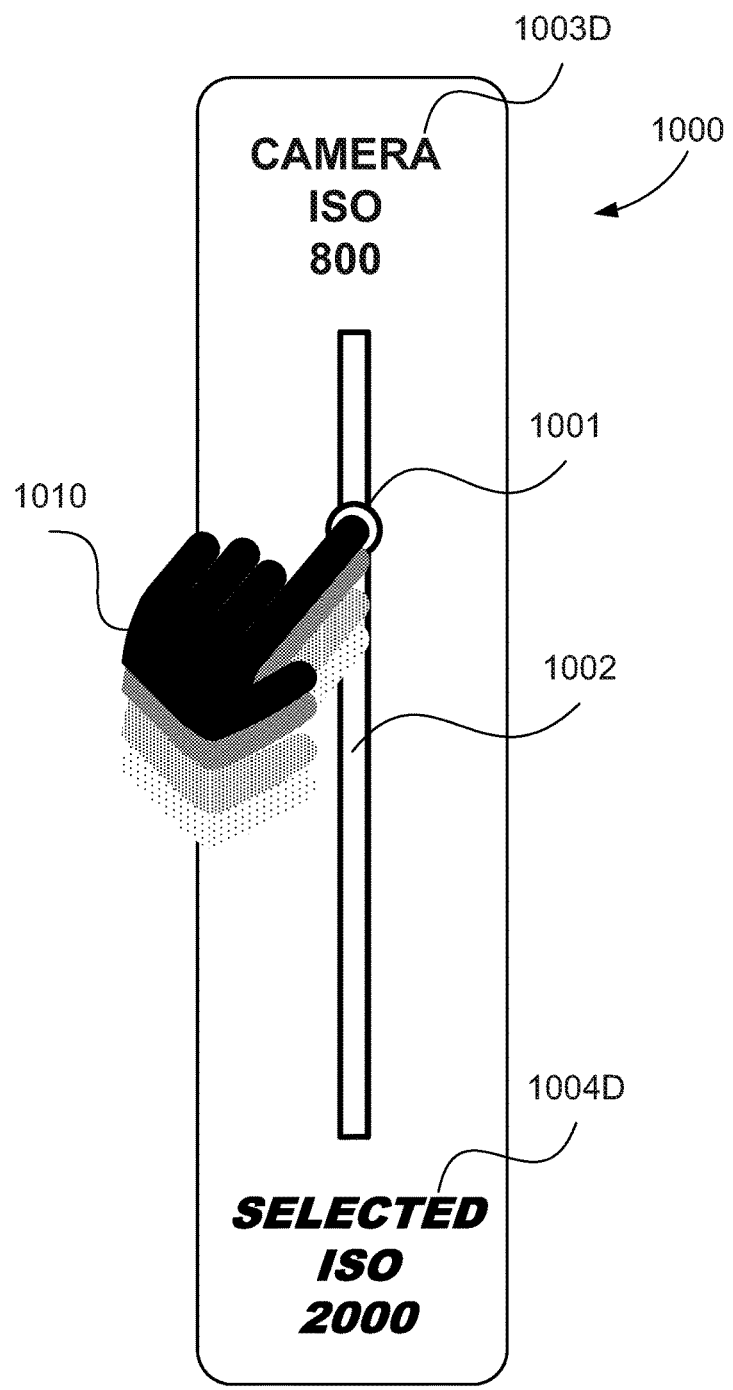
FIGS. 10D, 10E, 10F and 10G show operation of alternative methods of providing feedback to the user.

In further arrangements, as shown for the slider 1000 in FIG. 10D, the state of the image capture device 120 is displayed using a label 1003D. The state of the image capture device is displayed independently from the currently selected slider value, as indicated by a label 1004D. The label 1004D corresponds to the current slider position 1001 subject to manipulation 1010 along the track 1002 by the user.

As a further indication of a correlation between the two values as displayed by labels 1003D and 1004D, one or both of the labels 1003D or 1004D a corresponding separate set of styles in accordance with correlation between the user selected control parameter value and the value in use at the image capture device 120.

Figure 10E:
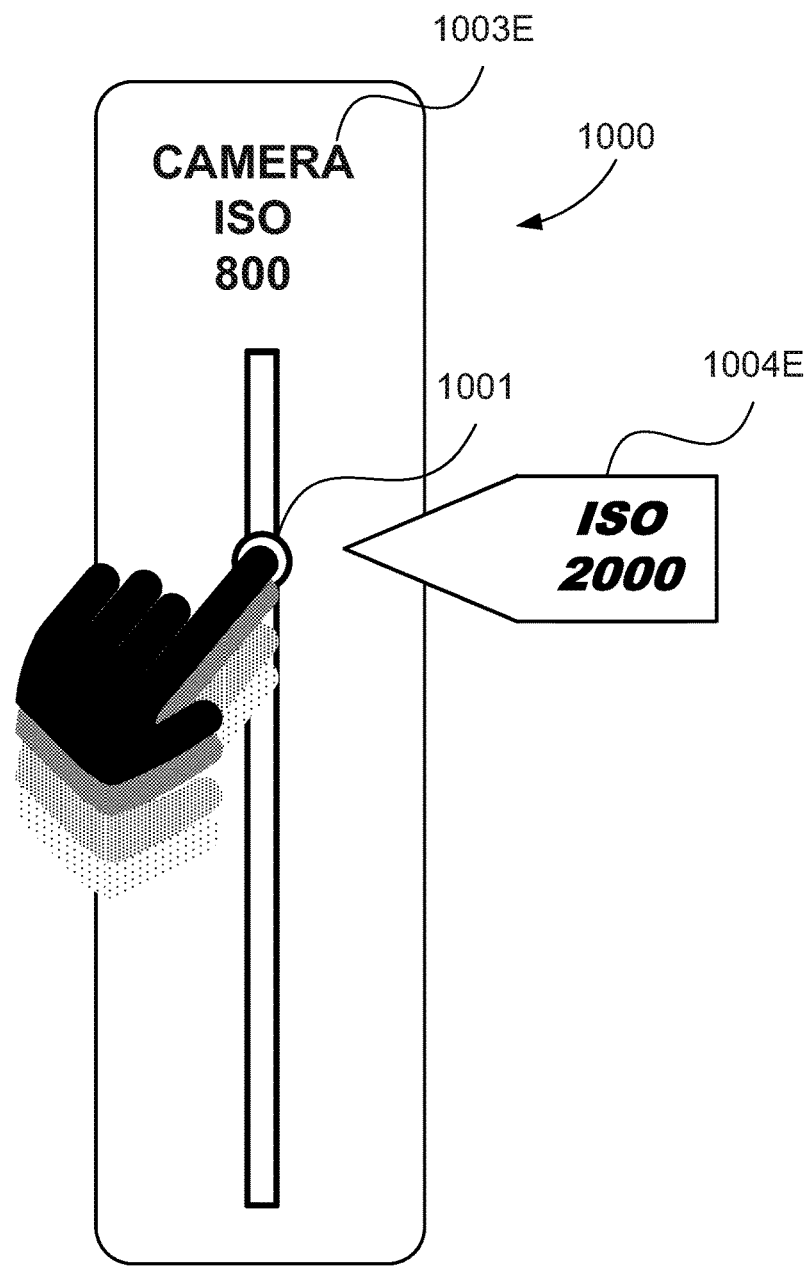

FIG. 10E shows another arrangement for providing feedback to the user. The slider 1000 of FIG. 10E shows a further method of feedback presentation. A marker 1004E points to the position of the indicator 1001 to designate the current value of the indicator 1001. The state of the image capture device 120 is displayed separately using a label 1003E.

As previously described, both the label 1003E and the marker 1004E can respond to changes in correlation between the user selected control parameter value and the value in use at the image capture device 120 by applying different styles.

In some arrangements, the marker 1004E may use animation to signal movement, and may appear or disappear depending on whether the selected parameter value differs from the value used at the remote image device 120.

Figure 10F:
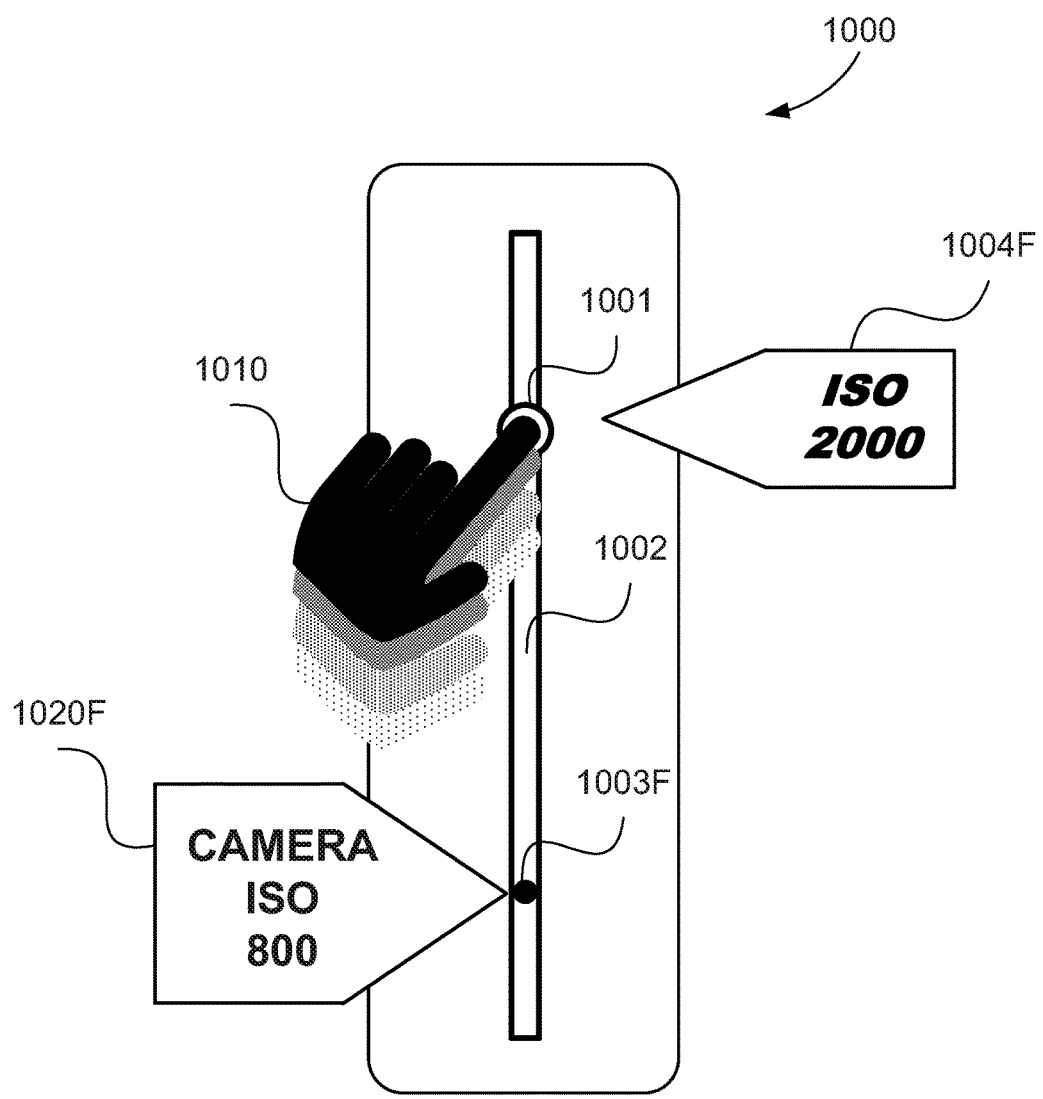

FIG. 10F shows a further method of providing feedback to the user. The slider 1000 of Fig. F includes a first marker 1004F pointing to a position of the indicator 1001. A second marker 1020F points to a slider-equivalent position 1003F (a position within track 1002F) that is equivalent to the current control parameter value used by the image capture device 120).

The first marker 1004F can change position to follow the user's manipulation 1010, and be used to indicate the corresponding currently selected value. The second marker 1020F can change position to follow corresponding changes in the slider-equivalent position 1003F as updates are received by display device 110 whilst monitoring of the image capture device 120 continues.

Figure 10G:
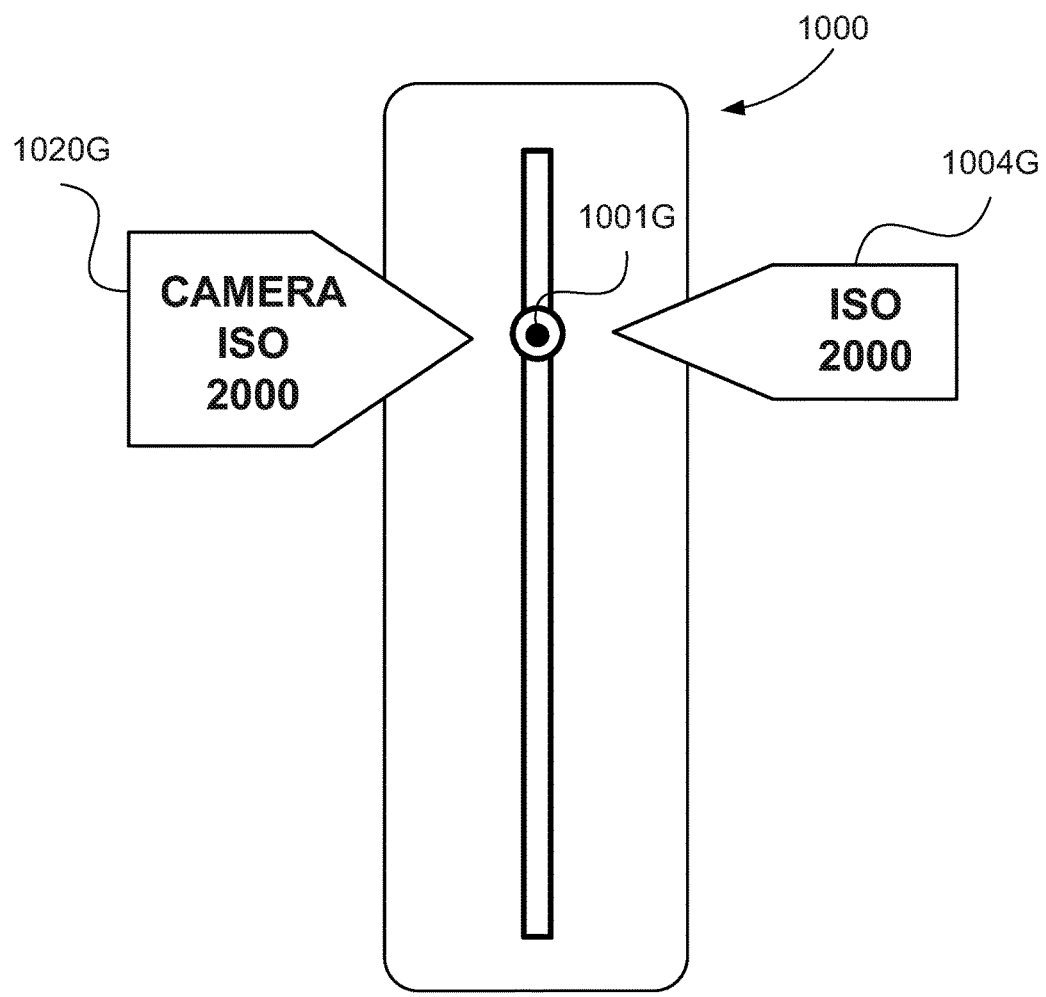

FIG. 10G shows another arrangement of the slider system 1000 In FIG. 10G, both a first marker 1004G and a second marker 1020G are pointing to the same position 1001G. A correlation is clearly indicated in FIG. 10G between the control parameter value used by the image capture device 120 and the current value relating to presentation of a video by the device 110, as determined from the position 1001G.

In other arrangements (not shown), in order to decrease visual clutter, the markers 1004G and 1020G do not contain any information but are merely used to indicate positions such as at 1003F and 1001G.

As previously described, both of the markers 1004F and 1020F can respond to correlation changes by applying different styles, disappearing and reappearing, and the like.

FIGS. 10A to 10G show methods of presenting or rendering a comparison of a status of the control parameter value of the image capture device 120 and a selection of control parameter values by the user at the interactive display device 110. Presentation of the comparison, that is use of different styles, is dependent upon the difference between the status of a control parameter value of the image capture device 120 and the selection of control parameter values by the user.

Figure 11:
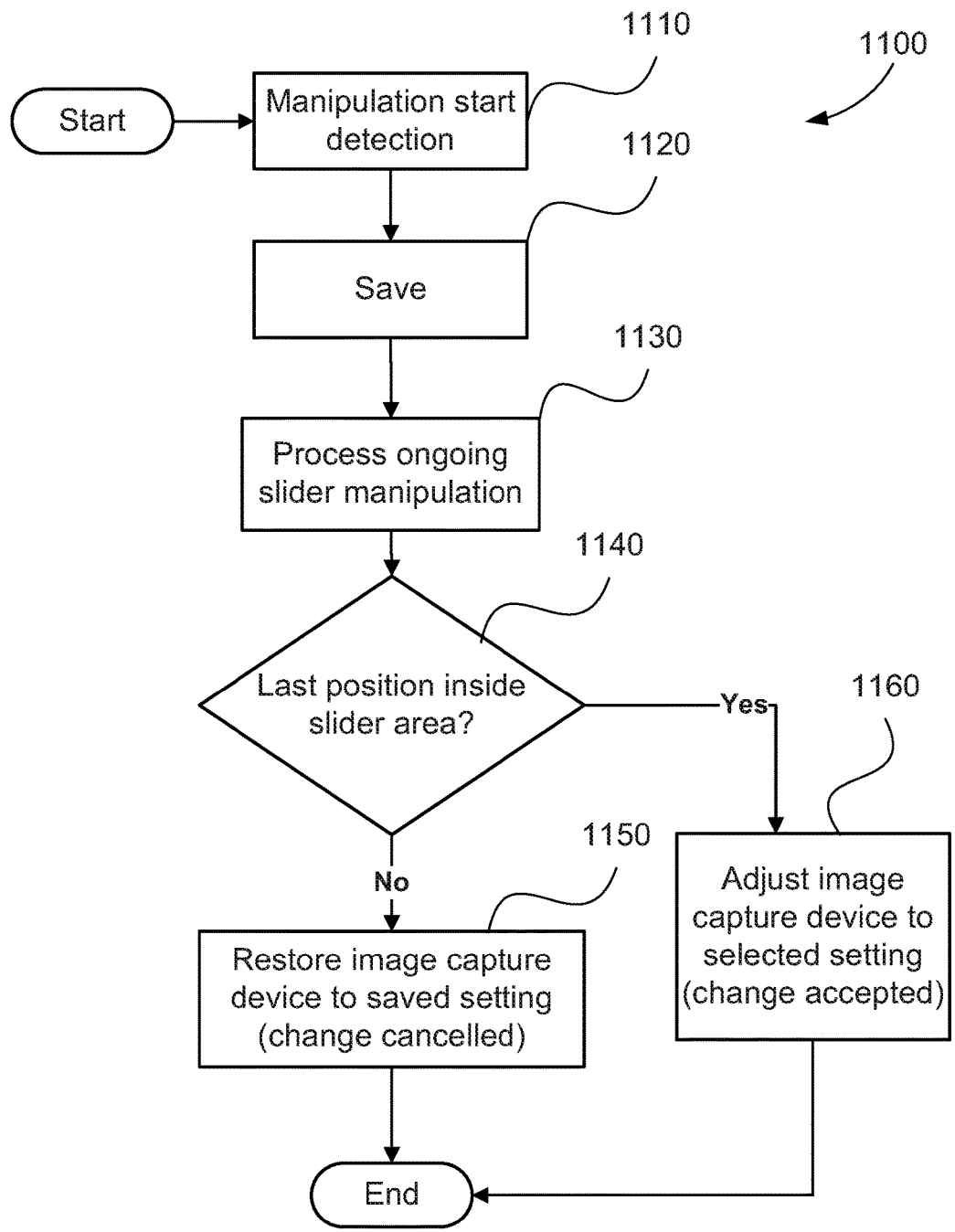
FIG. 11 is a schematic block diagram of a method of providing preview functionality.

FIG. 11 shows a method 1100 of previewing functionality. The method 1100 may be implemented as one or more submodules of the application 933, stored in a memory such as the memory 906 and controlled by execution of the processor 905.

The method 1100 begins at step 1110. Step 1110 executes to perform manipulation start detection by waiting until the user has touched the slider's indicator by interacting with the touch screen 914.

The method 1100 executes to progress to step 1120 upon manipulation being detected in step 1110. The current control parameter value of the image capture device 120 is saved in execution of step 1120 by, for example, storing the current control parameter value in the memory 906.

The method 1100 proceeds from step 1120 to step 1130. Step 1130 executes to process ongoing slider manipulation in accordance with the methods of FIGS. 6 and 7. Step 1130 continues to execute until an end of manipulation is detected by, for example, determining when the user's finger has broken contact with the touch screen 914 surface of the display device 110. Such operation results in selection of suitable events and triggering of sequential transmission of events to the image capture device 120, based upon at least the rate of change of the user selected values. The video stream received and presented by the interactive display device may reflect a number of transmissions of interim control parameters by the interactive display device 110 and corresponding adjustments by the image capture device 120 during step 1130. Step 1130 executes during the user manipulation of the slider.

Accordingly, in presentation of the video stream generated using control parameters corresponding to interim control parameter values, the user is provided with a preview of their selected values.

The interactive display device detects that the user has finished manipulation of the slider. A last position of the user's finger on the touch screen 914 is determined and saved as a stopping point by, for example, storing the position in the memory 906.

Once step 1130 has detected the end of slider manipulation, the method 1100 progresses to step 1140. Execution of the step 1140 performs a hit-test between the last contact position stored in step 1130 and an area of the slider (for example a graphical area enclosing the slider).

If the last contact position is determined to be inside the slider area at step 1140 (step 1140 returns a "Yes"), the method 1100 proceeds to step 1160. Execution of step 1160 transmits instructions to adjust the corresponding control value of the image capture device 120 to the last slider value as stored in execution of step 1130. Step 1160 effectively results in transmission of a final control parameter value to the image capture device 120. The final control value is adapted to adjust the control parameter of the image capture device.

If the last position is determined not to be inside the slider area in execution of step 1140 (step 1140 returns "No"), the method 1100 proceeds to step 1150. Execution of step 1150 provides instructions to the image capture device 120 to adjusts the image capture device 120 to the corresponding control parameter value as saved in step 1120. In other arrangements, step 1150 may not transmit any further control parameter values to the image capture device 120. Such may occur for example if a predicted control selected value was transmitted to the image capture device in execution of step 1130.

Steps 1130 to 1160 effectively operate to determine, based upon the stopping point, whether to transmit a final control parameter value to the image capture device.

The arrangements described are applicable to the computer and data processing industries and particularly for the remote adjustment of control parameters of an image capture device in the photography and video industries.

The foregoing describes only some embodiments of the present invention, and modifications and/or changes can be made thereto without departing from the scope and spirit of the invention, the embodiments being illustrative and not restrictive.

The invention claimed is:

1. A computer-implementable method of adjusting a control parameter of an image capture device, the method comprising:
   detecting, at an interactive display device, a substantially continuous user selection of values of a control parameter of the image capture device, wherein the user selection is detected from user manipulation of a continuously-variable input control of the interactive display device;
   determining a rate of change of the user selected values of the control parameter during user manipulation of the continuously-variable input control;
   determining, based upon at least the determined rate of change, whether to transmit each of the selected values; and
   sequentially transmitting, the selected values to the image capture device, via a communications network, where the selected values are determined to be transmitted, wherein each of the transmitted values is transmitted as an interim control parameter value, and the transmitted values are adapted to adjust the control parameter of the image capture device.

2. The method according to claim 1, wherein the rate of change is speed and the determined rate of change is non-zero.

3. The method according to claim 1, wherein the transmission is triggered according to the determined rate of change and a delay associated with adjustment of the control parameter by the image capture device.

4. The method according to claim 1,
wherein the transmission is triggered according to the determined rate of change and a delay associated with adjustment of the control parameter by the image capture device, and
wherein the delay is determined based upon at least one of delay associated with the communications network and delay associated with operation of the image capture device.

5. The method according to claim 1, further comprising:
detecting, in real-time and by the interactive display device via the communications network, a status of the image capture device in relation to the control parameter; and
displaying, in real-time and by the interactive display device, a comparison of the detected status and the user selection of values.

6. The method according to claim 1, further comprising:
detecting, in real-time and by the interactive display device via the communications network, a status of the image capture device in relation to the control parameter; and
displaying, in real-time and by the interactive display device, a comparison of the detected status and the user selection of values,
wherein presentation of the comparison displayed by the interactive display device is dependent upon a difference between the status of the image capture device and the user selection of values.

7. The method according to claim 1, wherein at least one of determining the rate of change of the user selected values, determining whether to transmit each of the selected values, and sequentially transmitting the selected values, is implemented by the interactive display device.

8. The method according to claim 1, wherein at least one of determining the rate of change of the user selected values, determining whether to transmit each of the selected values, and sequentially transmitting the selected values, is implemented by a server computer in communication with the interactive display device via the communications network.

9. The method according to claim 1, wherein determining the rate of change includes determining at least one of speed and acceleration.

10. The method according to claim 9, further comprising:
determining both speed and acceleration; and
predicting a final user selection from the determined speed and acceleration.

11. The method according to claim 1, wherein determining whether to transmit each of the selected values and sequentially transmitting the selected values are executed during user manipulation of the continuously-variable input control.

12. The method according to claim 1, further comprising:
detecting that the user manipulation of the continuously-variable input control has reached a stopping point; and
determining, based upon the stopping point, whether to transmit a final control parameter value to the image capture device, wherein the final control parameter value is adapted to adjust the control parameter of the image capture device.

13. The method according to claim 1, further comprising:
detecting that the user manipulation of the continuously-variable input control has reached a stopping point; and
determining, based upon the stopping point, whether to transmit a final control parameter value to the image capture device,
wherein the final control parameter value is adapted to adjust the control parameter of the image capture device, and
wherein determining whether to transmit a final control parameter value to the image capture device is based upon a predicted final value of the control parameter value.

14. The method according to claim 1, further comprising:
receiving, by the interactive display device via the communications network, output of the image capture device, wherein the output is generated according to one of the interim control parameter values and is received during the user manipulation of the continuously-variable input control; and
displaying, by the interactive display device, the output to the user.

15. An interactive display device for adjusting a control parameter of an image capture device, the interactive display device comprising:
a memory;
a processor coupled to the memory for executing a computer program, the computer program comprising instructions for:
detecting, at an interactive display device, a substantially continuous user selection of values of a control parameter of the image capture device, wherein the user selection is detected from user manipulation of a continuously-variable input control of the interactive display device,
determining a rate of change of the user selected values of the control parameter during user manipulation of the continuously-variable input control,
determining, based upon at least the determined rate of change, whether to transmit each of the selected values, and
sequentially transmitting, the selected values to the image capture device, via a communications network, where the selected values are determined to be transmitted,
wherein each of the transmitted values is transmitted as an interim control parameter value, and the transmitted values are adapted to adjust the control parameter of the image capture device.

16. A non-transitory computer readable storage medium having stored thereon a computer program to perform a computer-implementable method of adjusting a control parameter of an image capture device, the method comprising:
detecting, at an interactive display device, a substantially continuous user selection of values of a control parameter of the image capture device, wherein the user selection is detected from user manipulation of a continuously-variable input control of the interactive display device;
determining a rate of change of the user selected values of the control parameter during user manipulation of the continuously-variable input control;
determining, based upon at least the determined rate of change, whether to transmit each of the selected values; and
sequentially transmitting, the selected values to the image capture device, via a communications network, where the selected values are determined to be transmitted, wherein each of the transmitted values is transmitted as an interim control parameter value, and the transmitted values are adapted to adjust the control parameter of the image capture device.

17. A system comprising:
an image capture device;
an interactive display device; and
a communications network coupling the image capture device to the interactive display device;
wherein the system is adapted to perform a computer-implementable method of adjusting a control parameter of the image capture device, the method comprising:
detecting, at the interactive display device, a substantially continuous user selection of values of a control parameter of the image capture device, wherein the user selection is detected from user manipulation of a continuously-variable input control of the interactive display device;
determining a rate of change of the user selected values of the control parameter during user manipulation of the continuously-variable input control;
determining, based upon at least the determined rate of change, whether to transmit each of the selected values; and
sequentially transmitting, the selected values to the image capture device, via a communications network, where the selected values are determined to be transmitted,
wherein each of the transmitted values is transmitted as an interim control parameter value, and the transmitted values are adapted to adjust the control parameter of the image capture device.

* * * * *